United States Patent [19]

Takada et al.

[11] Patent Number: 5,468,443
[45] Date of Patent: Nov. 21, 1995

[54] METHOD AND APPARATUS OF INJECTION STRETCH BLOW MOLDING

[75] Inventors: Minoru Takada; Kouichi Satoh; Kazuyuki Yokobayashi, all of Ueda; Shuichi Ogihara, Komoro, all of Japan

[73] Assignee: Nissei ASB Machine Co., Ltd., Nagano, Japan

[21] Appl. No.: 44,707

[22] Filed: Apr. 12, 1993

[30] Foreign Application Priority Data

Apr. 24, 1992 [JP] Japan ................................. 4-131559
Oct. 28, 1992 [JP] Japan ................................. 4-314154

[51] Int. Cl.$^6$ ............................ B29C 49/06; B29C 49/28
[52] U.S. Cl. .......................... 264/537; 425/526; 425/533; 425/534; 264/532
[58] Field of Search .............................. 264/537, 523, 264/535; 425/534, 533, 529, 526

[56] References Cited

U.S. PATENT DOCUMENTS

| | | |
|---|---|---|
| 4,185,812 | 1/1980 | Hall . |
| 4,197,073 | 4/1980 | Rees et al. . |
| 4,372,910 | 2/1983 | Stroup et al. . |
| 4,470,796 | 9/1984 | Stroup et al. . |
| 4,824,359 | 4/1989 | Poehlsen ................................ 425/534 |
| 4,895,509 | 1/1990 | Giacobbe ............................... 425/534 |
| 5,169,654 | 12/1992 | Koga ..................................... 264/537 |

FOREIGN PATENT DOCUMENTS

| | | |
|---|---|---|
| 228106 | 7/1987 | European Pat. Off. ............... 425/534 |
| 0300549 | 1/1989 | European Pat. Off. . |
| 0334483 | 9/1989 | European Pat. Off. . |
| 0411592A2 | 2/1991 | European Pat. Off. . |
| 2394381 | 6/1978 | France . |
| 53-22096 | 7/1978 | Japan . |
| 64-3657 | 1/1989 | Japan . |
| 1-275122 | 11/1989 | Japan . |
| 2-32973 | 7/1990 | Japan . |
| 159726 | 7/1991 | Japan . |
| 2093396 | 9/1982 | United Kingdom ................... 425/534 |

OTHER PUBLICATIONS

Patent Abstracts of Japan, vol. 6, No. 267 (M–182) (1145) 25 Dec. 1982 & JP-A-57 159 624 (Toshiba Kikai K.K.) 1 Oct. 1982.
Patent Abstracts of Japan, vol. 015, No. 389 (M1164) 2 Oct. 1991 & JP-A-03 159 726 (Nissei) 9 Jul. 1991.

*Primary Examiner*—Catherine Timm
*Attorney, Agent, or Firm*—Oliff & Berridge

[57] ABSTRACT

An injection stretch blow molding method sequentially circulates a plurality of neck mold moving units for supporting and conveying neck molds adapted to hold the neck portions of hollow containers and preforms used to mold the hollow containers at least through preform injection molding, blow molding and ejecting stations, the preform injection molding step, the blow molding step for blow molding the hollow containers from the preforms having their potential heat provided by the injection molding step and the product ejecting step being repeatedly carried out. The injection molding stations of M in number are provided for blow molding stations of N in number (M>N≧1). Preforms are injection molded in each of the injection molding stations at an injection molding start time staggered from those of the other injection molding stations by time equal to N×T/M where T is an injection molding cycle time in each of the injection molding stations. The neck mold moving units are sequentially moved from the injection molding stations to the empty blow molding station after the respective one of the injection molding stations has molded the preforms. The preforms are blow molded into the hollow containers in the blow molding stations through their blow molding cycle time which is set within N×T/M.

25 Claims, 24 Drawing Sheets

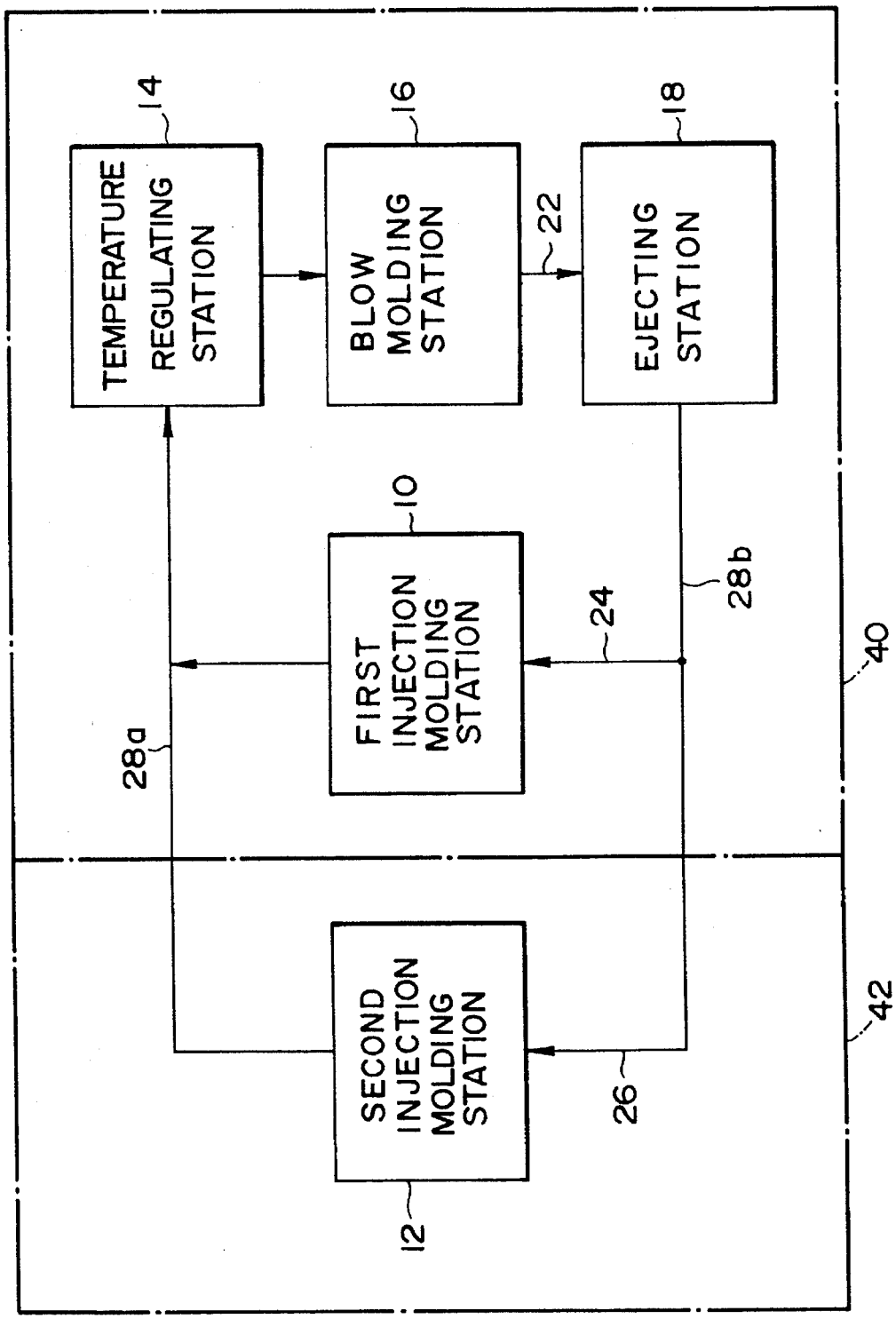

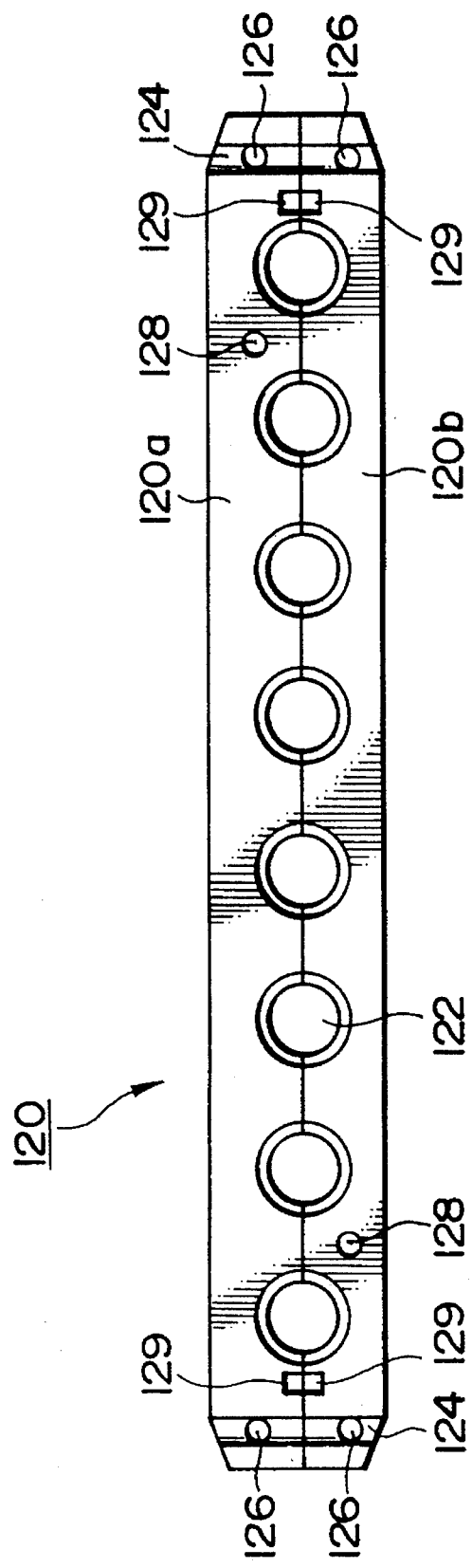
FIG. 12A
FIG. 12B

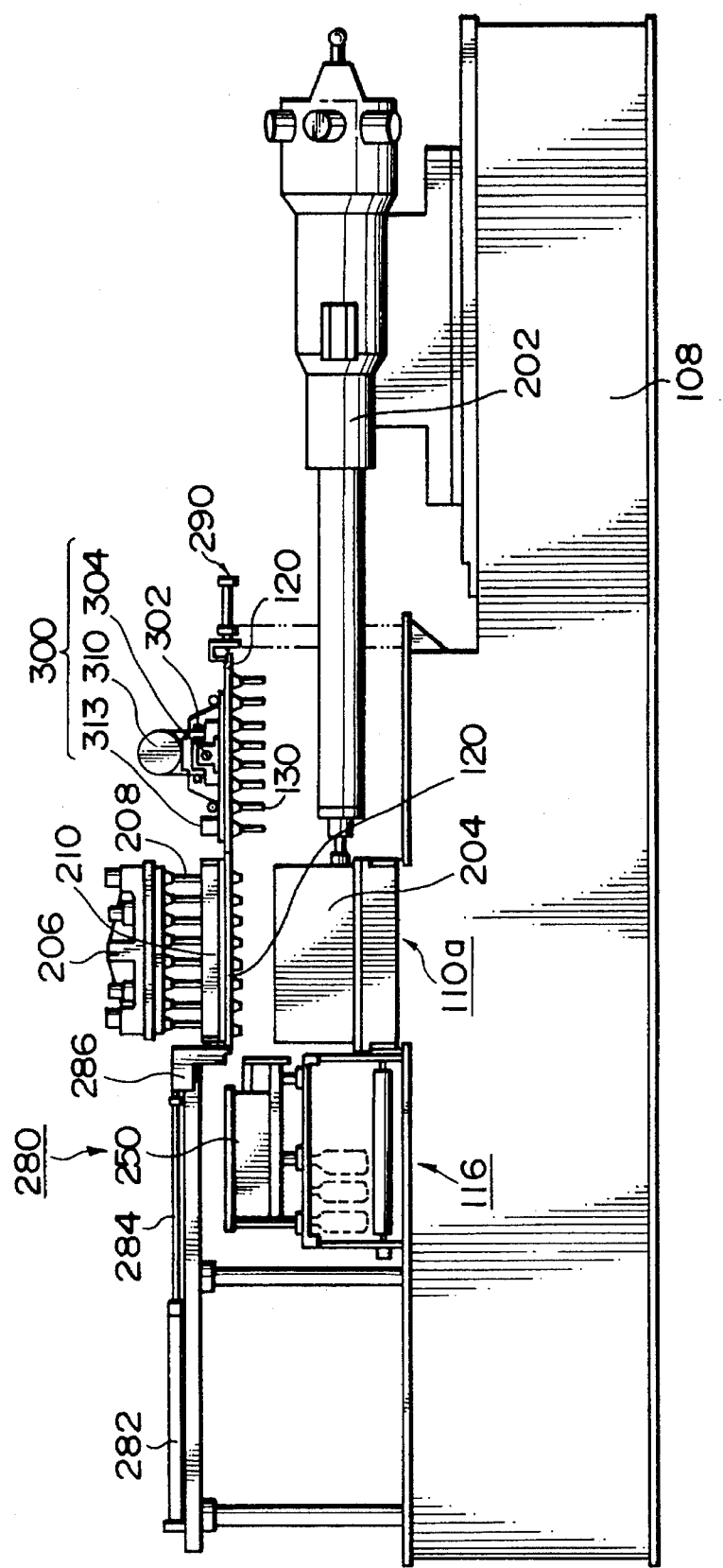

METHOD AND APPARATUS OF INJECTION STRETCH BLOW MOLDING

BACKGROUND OF THE INVENTION

1. Field of the Invention

The present invention relates to a hot-parison type injection stretch blow molding method and apparatus which continuously perform at least steps of injection molding, blow molding and ejecting a preform (parison) throughout one stage.

2. Description of the Related Art

A typical one-stage blow molding apparatus of such a type is disclosed in Japanese Patent Publication No. Sho 58-22096. The apparatus comprises a machine base which has an injection molding station, a temperature regulating station, a blow molding station and an ejecting station respectively located on the base at its four sides. The apparatus also comprises a rotary disc rotatably disposed above the base. The rotary disc includes four neck plates disposed on the rotary disc at its four locations. The neck plate supports a plurality of neck molds each for holding a neck of a preform or bottle. When the rotary disc is intermittently rotated every 90 degrees, the four neck plates are sequentially moved to the respective stations.

Japanese Patent Laid-Open No. Hei 1-275122 describes an improvement on the aforementioned apparatus to increase the efficiency of production per unit time. In the improved apparatus, two lines of neck plates are disposed on the rotary disc at each of the four locations therein.

Japanese Patent Publication No. Sho 64-8657 describes a system for conveying a plurality of neck mold moving units along linear path, rather than the rotary disc. The system comprises injection molding, temperature regulating and blow molding stations which are arranged in a line. Each of the neck mold moving units is asynchronously moved with the injection molding cycle to facilitate the setting of the molding time.

In this connection, the efficiency of bottle production per unit time in the blow molding, apparatus depends on the working ratio of blow molds in the blow molding station. It was pointed out that the aforementioned one-stage type blow molding apparatus is lower in efficiency than two-stage type blow molding apparatus. The two-stage type blow molding apparatus comprises one stage of injection molding a preform and another separate stage of blow molding a bottle which is formed from the preform in the injection molding stage. The two-stage type blow molding apparatus can supply a preform to the blow molding station synchronously with the blow molding cycle and thus realize a relatively high production efficiency. In the one-stage blow molding apparatus, however, the molding cycle time depends on time required to perform the injection molding process, which is longer than time required to make the blow molding process. It is thus impossible to supply the preform synchronously with the blow molding cycle time. As a result, the working ratio of the blow molds in the blow molding station could not be improved.

In Japanese Patent Laid-Open No. Hei 3-159726, the inventors has proposed a system for conveying the neck mold moving units asynchronously with the injection molding cycle to improve the working ratio in the blow molding station.

The proposed system comprises a working line of rectangular configuration including preform injection molding, temperature regulating, blow molding and ejecting stations which are arranged on the working line along its one longitudinal side. The other longitudinal side of the working line is used to return the neck mold moving units to the injection molding station. The system includes two lines of injection molding stations, two lines of temperature regulating stations and one line of blow molding station. Preforms respectively injection molded and temperature regulated by the injection molding and temperature regulating stations can be aligned into a single line and then conveyed into the blow molding station. Thus, the working ratio of blow molds in the blow molding station can be improved.

However, if preforms are simultaneously molded in both the two injection molding stations, preforms from one of the injection molding lines can be conveyed directly into the blow molding station only when another preforms from the other injection molding line is in its stand-by state. In the hot-parison type blow molding apparatus, the blow molding is carried out utilizing the potential heat provided by the injection molding step. Therefore, the temperature in the stand-by preform may vary through the passage of time. It becomes impossible to form bottles of uniform quality throughout the lines.

Thus, the prior art cannot blow mold preforms under equal conditions after they have been injection molded and temperature regulated in the different lines, respectively.

In the prior art, furthermore, the neck mold moving units must be returned from the ejecting station back to the injection molding stations through a relatively long distance therebetween. The neck mold moving units must be held at their stand-by position in front of each of the injection molding station lines. It is therefore required to provide at least two neck mold moving units more than the total number of stations.

The neck molds used in the one-stage type blow molding apparatus are also used as neck cavity molds in the injection molding stations. Thus, the neck molds requires a substantially increased dimensional accuracy and are expensively manufactured. As a result, the increased number of neck molds will increase the manufacturing cost of the entire system.

SUMMARY OF THE INVENTION

It is therefore an object of the present invention to provide an injection stretch blow molding method and apparatus which can improve the working ratio of blow molds and also maintain the quality of hollow products uniform by performing the blow molding of preforms under equal conditions while they are injection molded by a plurality of injection molding stations.

Another object of the present invention is to provide an injection stretch blow molding method and apparatus which can suppress the increase of the number of neck mold moving units as little as possible to form hollow products with lower cost while improving the working ratio of blow molds to increase the production efficiency.

Still another object of the present invention is to provide an injection stretch blow molding apparatus which can comprise two injection molding stations for a single blow molding station to improve the working ratio of blow molds and to increase the number of moldings per unit time, maintain the quality of hollow products uniform through the repetition of the blow molding step and further use the minimum number of neck mold moving units or neck plates to realize an improved efficiency of conveyance.

To this end, the present invention provides an injection stretch blow molding method of sequentially circulating a plurality of neck mold moving units for supporting and conveying neck molds adapted to hold the neck portions of hollow containers and preforms used to mold the hollow containers at least through preform injection molding, blow molding and ejecting stations, the preform injection molding step, the blow molding step for blow molding the hollow containers from the preforms having their potential heat provided by the injection molding step and the product ejecting step being repeatedly carried out, said method comprising the steps of providing injection molding stations of M in number for blow molding stations of N in number (M>N≧1), injection molding preforms in each of the injection molding stations at an injection molding start time staggered from those of the other injection molding stations by time equal to N×T/M where T is the injection molding cycle time in each of the injection molding stations; moving the neck mold moving units sequentially from the injection molding stations to the empty blow molding station after the respective one of the injection molding stations has molded preforms, and blow molding the preforms into the hollow containers in the blow molding stations through their blow molding cycle time which is set within N×T/M.

The present invention also provides an injection stretch blow molding apparatus comprising a plurality of neck mold moving units for supporting and conveying the neck molds adapted to the neck portions of hollow containers and preforms used to form the hollow containers; injection molding stations of M in number, each of said injection molding stations being adapted to receive the neck mold moving units sequentially and to injection mold the preforms at an injection molding start time staggered from those of the other injection molding stations; blow molding stations of N in number (M>N≧1), each of said blow molding stations being adapted to receive the neck mold moving units each supporting the preforms having their a potential heat provided on the injection molding sequentially from the injection molding stations and to blow mold said preforms in to hollow containers; and an ejecting station For receiving the neck mold moving units each supporting the hollow containers sequentially, from the blow molding stations and for ejecting said hollow containers out of said neck mold moving units, each of the injection molding stations being adapted to injection mold preforms at an injection molding start time staggered from those of the other injection molding stations by time equal to N×T/M where T is an injection molding cycle time in each of the injection molding stations, the neck mold moving units being sequentially moved from the injection molding stations to the empty blow molding station after the respective one of the injection molding stations has molded preforms, the blow molding stations being adapted to blow mold the preforms into the hollow containers in through their blow molding cycle time which is set to be within N×T/M.

For example, if two injection molding stations are provided for a single blow molding station, the injection molding stations are different in injection molding start time from each other by substantially one-half of the injection melding cycle time T, that is, T/2. On the other hand, the blow molding station is set to have its blow molding cycle time equal to or less than T/2. The blow molding step for blow molding preforms formed by one of the injection molding stations has been terminated before the other injection molding station has completed to injection mold another preforms. As a result, the preforms conveyed from the two injection molding stations to the blow molding station with a time delay will be blow molded directly under equal conditions. Thus, the quality of hollow blow molded containers can be maintained uniform.

On carrying out the method of the present invention, it is preferred that the blow molding and ejecting stations are arranged in the first conveyance line and that a plurality of second conveyance lines are arranged parallel to the first conveyance line, each of the second conveyance lines including a single injection molding station arranged thereon. This does not require that after passed through the ejecting station, the neck mold moving units are returned back to the injection molding stations through the longer distance therebetween, as in the prior art. A series of steps can smoothly be carried out simply by circulating the same number of neck mold moving units as the total number of stations.

If a temperature regulating station is provided upstream of the blow molding station, it is preferably disposed on the first conveyance line. If the temperature regulating cycle time at the temperature regulating station is set to be equal to the blow molding cycle time, preforms injection molded by the respective injection molding stations can be regulated in temperature and conveyed to the blow molding station under equal conditions. In such an arrangement, further, the conveyance lines connecting between the stations will not extremely be increased in length. Therefore, only one neck mold moving unit more than the total number of stations may be provided to perform a series of steps smoothly.

Alternatively, one blow molding station may be disposed on the first conveyance line for the neck mold moving units while the second conveyance lines parallel to the first conveyance line may include one ejecting station and two injection molding stations located equidistantly spaced away from and parallel to the ejecting station. In this case, if five neck mold moving units for the total number of said stations equal to four are circulated through the respective stations, a series of steps can be carried out smoothly. When the temperature regulating station is disposed on the first conveyance line and if six neck mold moving units for the total number of said stations equal to five are circulated through the stations, a series of steps can be carried out smoothly.

The present invention further provides an injection stretch blow molding apparatus at least comprising a plurality of neck plates for supporting and conveying the neck molds adapted to the neck portions of hollow containers and preforms used to form the hollow containers; two injection molding stations for alternately receiving said neck plates, each of said injection molding stations being adapted to injection mold said preforms at an injection molding start time different from that of the other injection molding station by substantially one-half of the injection molding cycle time T; a blow molding station for alternately receiving the neck plates supporting said preforms with a potential heat provided by the injection molding step from said two injection molding stations, said preforms being blow molded into hollow containers within said injection molding start time (T/2); and an ejecting station for receiving said neck plates supporting said hollow containers from said blow molding station and for ejecting each of the hollow containers out of the corresponding one of said neck molds, said ejecting station being located in an area adjacent to said two injection molding stations and at a middle position from which said neck plates are moved from said ejecting station to said two injection molding stations through an equal distance.

The two injection molding stations are different in injection molding start time from each other by substantially one-half of the injection molding cycle time T. The blow molding station downstream of the injection molding stations has its blow molding cycle time equal to or less than T/2. The blow molding step using preforms molded by one of the injection molding stations will be terminated prior to the end of the injection molding step in the other injection molding station. Therefore, preforms conveyed from the two injection molding stations to the blow molding station with a time delay can be received and blow molded by the blow molding station into hollow containers with uniform quality under equal conditions.

Since in the present invention, the ejecting station being located in an area adjacent to said two injection molding stations and at a middle position from which said neck plates are moved from said ejecting station to said two injection molding stations through an equal distance, the distance from the blow molding station to each of the two injection molding stations can be the same as that from the blow molding station to the other injection molding station. This also enables that distance to be minimum. Thus, the margin in time required to remove the neck plates after the blow molding step and to convey the neck plates to the injection molding stations can be increased to facilitate the conveyance of the neck plates within the set molding cycle.

Since the total weight of the neck plate and the neck molds supported by the neck plate are relatively light, the load required to perform the conveyance of the neck plate can be reduced with increase of the conveyance speed. This also assures a sufficient margin of conveyance to convey the neck plates between the stations within a limited time period.

BRIEF DESCRIPTION OF THE DRAWINGS

FIG. 2 is a plan view of neck mold moving unit conveyance lines used in the blow molding apparatus of FIG. 1.

FIGS. 12A and 12B are respectively plan and front views of a neck plate circulated through the stations in the blow molding apparatus of FIG. 11.

FIGS. 15A–15E schematically illustrate the operations and states of the blow molding apparatus at timings t1–t5 in FIG. 14.

FIG. 16 is a cross-sectional view taken along a line P—P in FIG. 11.

DETAILED DESCRIPTION OF THE PREFERRED EMBODIMENTS

Figure 1:
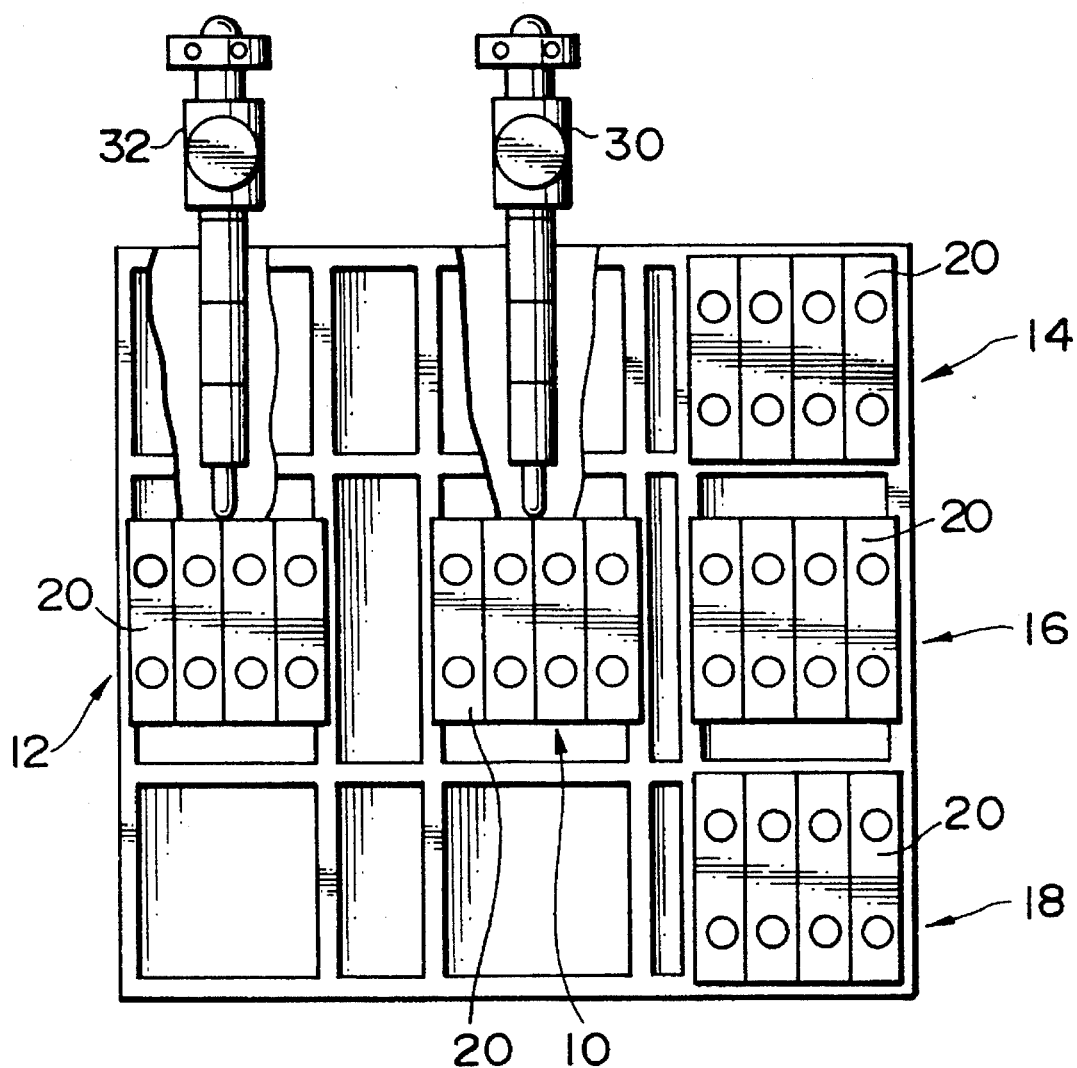
FIG. 1 is a plan view of a blow molding apparatus used to carry out the method of the present invention.

Referring to FIGS. 1 and 2, there is shown an apparatus for performing the method of the present invention and particularly a one-cycle molding process, with the arrangement of stations used herein. The apparatus is of substantially square configuration and a first injection molding station 10 disposed therein at the central position of the square configuration. A second injection molding station 12 is disposed adjacent to the first injection molding station 10, for example, its left side. Temperature regulating station 14, blow molding station 16 and ejecting station 18 are arranged adjacent to the right side of the first injection molding station 10 in a line. The apparatus comprises five neck mold moving units 20 which is the same number as the number of stations. Each of the neck mold moving units 20 comprises a frame, a neck plate held by the frame and a plurality of neck molds (e.g. eight neck molds) supported by the neck plate. Each of the neck molds is adapted to detachably hold the neck portion of a preform or bottle and also used as a neck cavity mold in the injection molding stations 10 and 12.

The neck mold moving units 20 are moved along the following conveyance path. The temperature regulating station 14, the blow molding station 16 the ejecting station 18 are arranged on the first conveyance line 22. The second and third conveyance lines 24 and 26 are disposed parallel to the first conveyance line 22. Each of the first and second injection molding stations 10 and 12 is located on the corresponding one of the conveyance lines 24 and 26. A supply and conveyance line 28a is further provided to supply and convey the neck mold moving units 20 from the second and third conveyance lines 24 and 26 to the first conveyance line 22. A return and conveyance line 28b is similarly provided to return the neck mold moving units 20 from the first conveyance line 22 back to the second and third conveyance lines 24 and 26.

The first and second injection molding stations 10 and 12 are of the same structure including an injection unit 80 or 82. Therefore, only the details of the first injection molding station 10 will now be described. In addition to the injection unit 30, the first injection molding station 10 has a nozzle-touchable hot runner mold on which injection cavity molds are disposed. Injection core molds are disposed above the injection cavity mold with the neck mold moving units 20 therebetween. When the injection cavity molds, neck molds and injection core molds are clamped, the apparatus is ready for injection molding preforms.

The temperature regulating station 14 is adapted to regulate the temperature of the injection molded preform into an appropriate stretching temperature. The temperature regulating station 14 includes temperature regulating core and pot between which the neck mold moving units 20 are located. When the temperature regulating core and pot are positioned in place, the temperature of the preform may be regulated outside and inside by the core and pot.

The blow molding station 16 is adapted to blow air into the preform after its temperature has been regulated into an appropriate stretching temperature. At the same time, the blow molding station 16 moves a stretching rod along its longitudinal axis to biaxially stretch and blow mold the preform into a bottle, with the stretching rod having been previously inserted into the interior of the molded preform. The blow molding station 16 comprises a combination of a blow core with a stretching rod and a blow cavity mold, between which the neck mold moving units 20 are disposed.

The ejecting station 18 is adapted to separate the blow molded bottles from the neck molds in the neck mold moving units 20. More particularly, when two halves of a split neck mold are opened, a molded bottle can be removed out of the neck mold.

The molding apparatus comprising the two injection molding stations 10 and 12 may be unitized as shown in FIG. 2. More particularly, a basic molding unit 40 may be formed by the first injection molding station 10, the temperature regulating station 14, the blow molding station 16 and the ejecting station 18 while an additional unit 42 may be defined by the second injection molding station 12 and portions partially defining the conveyance lines 28a and 28b. The molding unit 40 can solely realize a series of steps starting from the preform injection molding and terminating at the removal of molded bottle. When the additional unit 42 is connected to the molding unit 40 as in the illustrated embodiment, however, it can provide a molding apparatus having an increased throughput which can increase the number of molded bottles per unit time.

One embodiment of the method carried out by the aforementioned apparatus in accordance with the present invention will be described with reference to FIGS. 3 and 4.

Figure 3A:
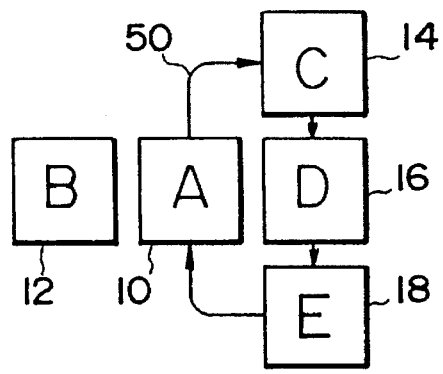
FIGS. 3A–3F respectively illustrate the neck mold moving units circulated through the respective stations at various positions.
Figure 3D:
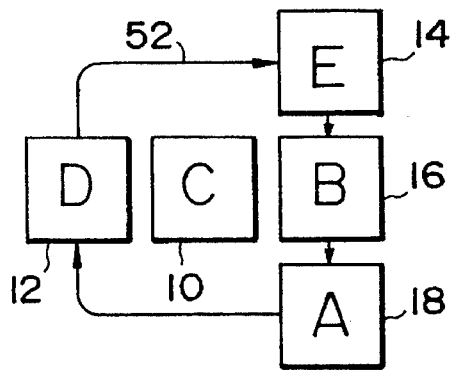
Figure 3B:
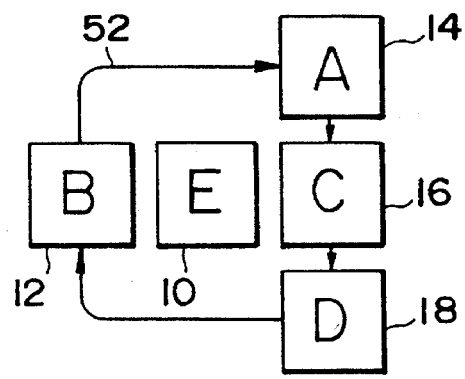
Figure 3E:
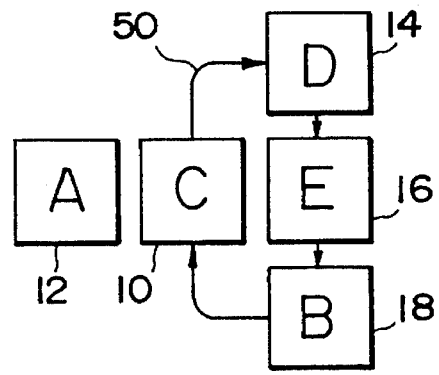
Figure 3C:
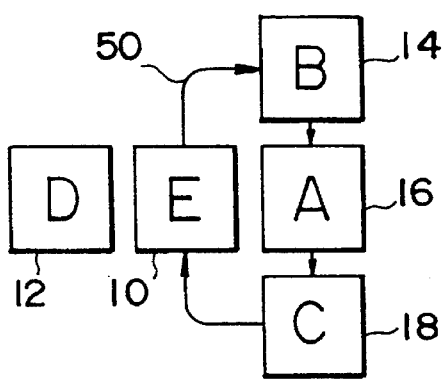
Figure 3F:
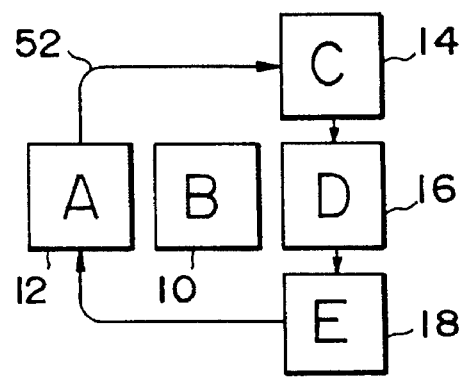
Figure 4:
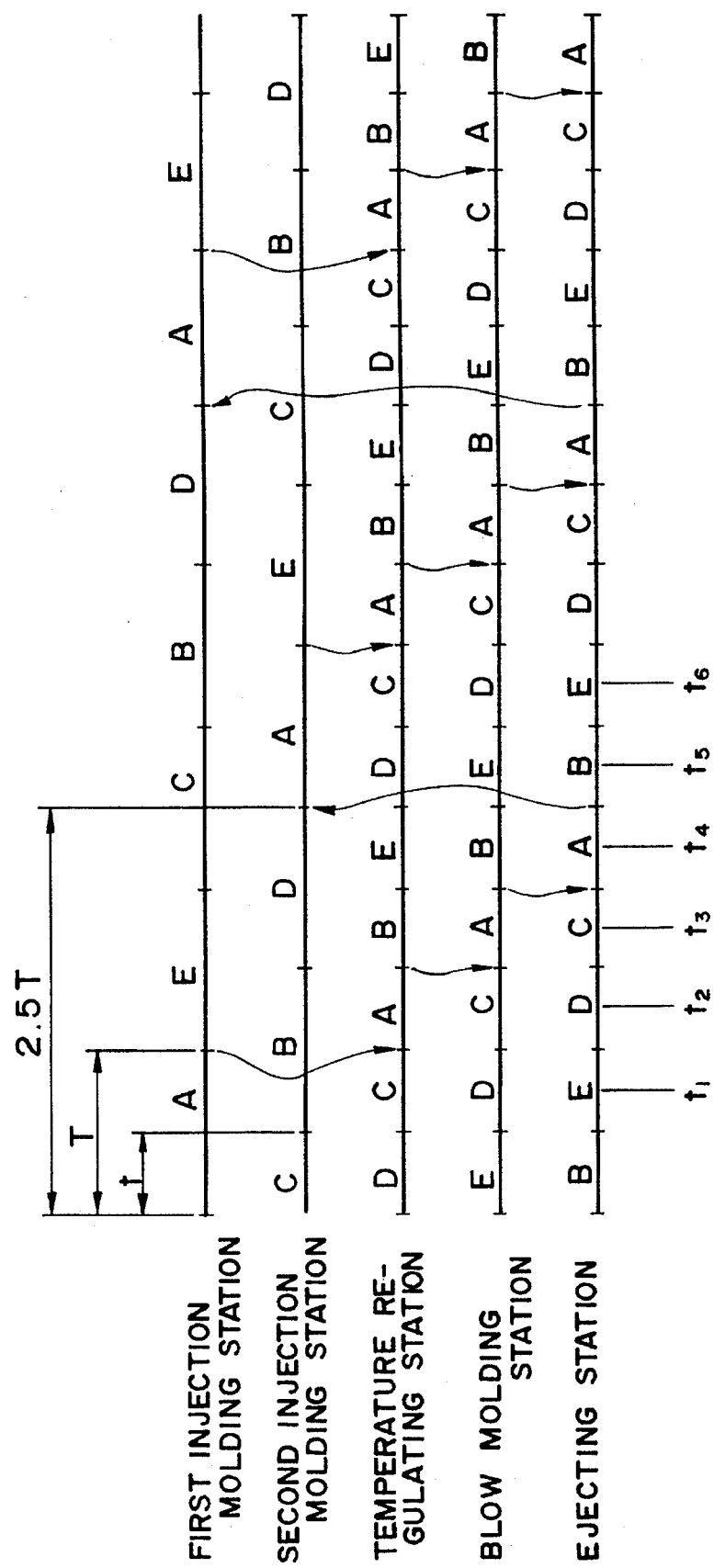
FIG. 4 is a timing chart illustrating the molding method carried out by the blow molding apparatus of FIG. 1.

In FIGS. 3A to 3F and 4, reference letters A–E denote neck mold moving units 20. FIG. 3A shows the initial position of each of the neck mold moving units A–E while FIG. 4 is a timing chart illustrating the positions of the neck mold moving units A–E at each of the stations. In FIG. 4, however, time required to convey the neck mold moving units between adjacent stations is omitted. Capital letter "T" in FIG. 4 is an injection molding cycle time in each of the first and second injection molding stations 10 and 12. The injection molding cycle time T indicates time required from start of clamping in the first or second injection molding station 10 or 12 until completion of conveyance of a new neck mold moving unit 20 into that injection molding station after the injection molding step has been terminated. The first and second injection molding stations 10 and 12 are different in injection molding start time from each other by a time difference t which is equal to T/2 in the illustrated embodiment. In the illustrated embodiment, further, a cycle time in each of the temperature regulating station 14, blow molding station 16 and ejecting station 18 is also equal to the time difference t between the injection molding start times in the first and second injection molding stations 10 and 12 for convenience.

FIG. 3A shows the position of each of the neck mold moving units A–E at a time t1 in FIG. 4. At this time, the first and second injection molding stations 10 and 12 include the neck mold moving units A and B, respectively. The injection molding step has been terminated in the first injection molding station with the neck mold moving unit A being ready for conveyance. Thus, the four neck mold moving units A, C, D and E will be circulated utilizing the first conveyance loop 50 shown in FIG. 8A. As a result, the neck mold moving units A–E will be placed in such positions as shown in FIG. 3B at a time t2 in FIG. 4. At this time, the injection molding step is terminated in the second injection molding station 12, with the neck mold moving unit B being ready for conveyance. The second conveyance loop 52 shown in FIG. 3B is then used to move the four neck mold moving units A–D. As a result, the neck mold moving units A–E will be placed in such positions as shown in FIG. 3C at a time t3 shown in FIG. 4.

Subsequently, the injection mold step is alternately performed and terminated in the first and second injection molding stations 10 and 12 in the same manner. The first and second conveyance loops 50 and 52 are alternately used to realize the placement of the neck mold moving units at various positions which are shown in FIG. 3D through 3F. In the state of FIG. 3F, the neck mold moving unit A used in the first injection molding station 10 at the initial condition is returned back to the injection molding station through the temperature regulating station 14, the blow molding station 16 and the ejecting station 18. At this time, this neck mold moving unit A will be placed in the second injection molding station 12. In the illustrated embodiment, thus, the cycle of movement of the neck mold moving units 20 can be carried out every T/2 while requiring the injection cycle time T in the first and second injection molding stations 10 and 12 by setting the time difference t (=T/2) at the start timing of injection molding in the first and second injection molding stations 10 and 12. This means that two blow molding steps can be realized at the blow molding station 16 within the injection molding cycle time T. It will increase the number of products per unit time twice more than the prior art method. Furthermore, the illustrated embodiment can also reduce the number of neck mold moving units 20. The prior art must provide two injection molding stations, two temperature regulating stations, two blow molding stations and two ejecting stations to increase the production efficiency twice. As a result, the prior art will have eight neck mold moving units. On the contrary, the illustrated embodiment only requires five neck mold moving units 20 to assure the same production efficiency. The neck molds in the neck mold moving units 20 are also used as neck cavity molds and thus require increase of the dimensional accuracy as well as increase of the manufacturing cost. The use of the illustrated embodiment can reduce the number of neck molds while increasing the production efficiency, resulting in reduction of the manufacturing cost.

Figure 5:
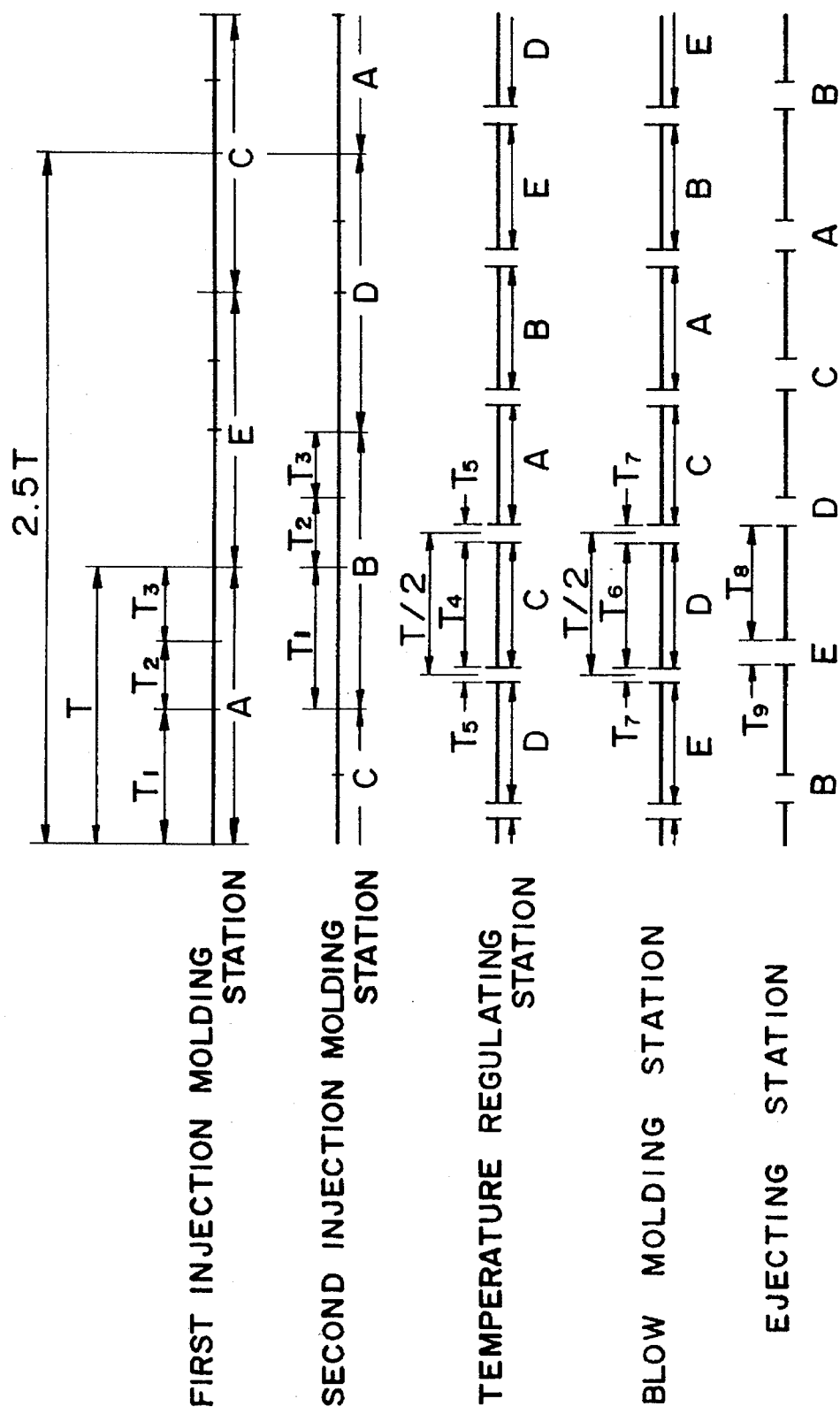
FIG. 5 is a timing chart illustrating the other different blow molding operation in the blow molding apparatus of FIG. 1.

FIG. 5 is a timing chart showing the details or the method according to the illustrated embodiment in consideration with the conveyance time between the adjacent stations. The injection molding cycle time T is divided into T1, T2 and T3. T1 indicates time required from start or the clamping step until termination of the injection molding step. T2 indicates time required to cool a preform within the mold after the injection molding step has been terminated. T3 indicates time required from removal of the neck mold moving unit 20 after opening of the injection mold until movement of a new neck mold moving unit 20 into that injection molding station. In the illustrated embodiment, the injection molding cycle-time T is set to be equal to 16 seconds, that is, T1=T/2. Time T4 in the temperature regulating station 14 indicates time substantially required to perform a temperature regulating operation. This time T4 includes time required to close the temperature regulating pot and core, to perform the temperature regulating step and then to open the temperature regulating pot and core. T5 in the temperature regulating station 14 indicates time required to move the neck mold moving unit 20 into and out of the temperature regulating station 14. In the illustrated embodiment, the setting is T4+T5=T/2. It will be apparent from FIG. 5 that a delay is created between the completion of the injection molding cycle time T in the injection molding stations 10 and 12 and the movement start time in the temperature regulating station 14. This is because time is required to move the neck mold moving unit 20 from the injection molding stations 10 and 12 to the temperature regulating station 14, as shown in FIG. 2.

T6 in the blow molding station 16 indicates time required to perform the blow molding step in this station 16. In other words, time T6 indicates time required to perform the clamping, blow molding and closing steps in the blow molding station 16. T7 in the blow molding station 16 indicates time required to move the neck mold moving unit 20 into and out of the blow molding station 16. In the illustrated embodiment, the setting is made to be T6+T7=T/2.

T8 in the ejecting station 18 is time required to perform the ejecting step which is relatively short. Thus, time T9 required to perform the conveyance before and after the ejecting step can be prolonged into a relatively long period. In the illustrated embodiment, the setting is made to be T8+T9=T/2.

Figure 6:
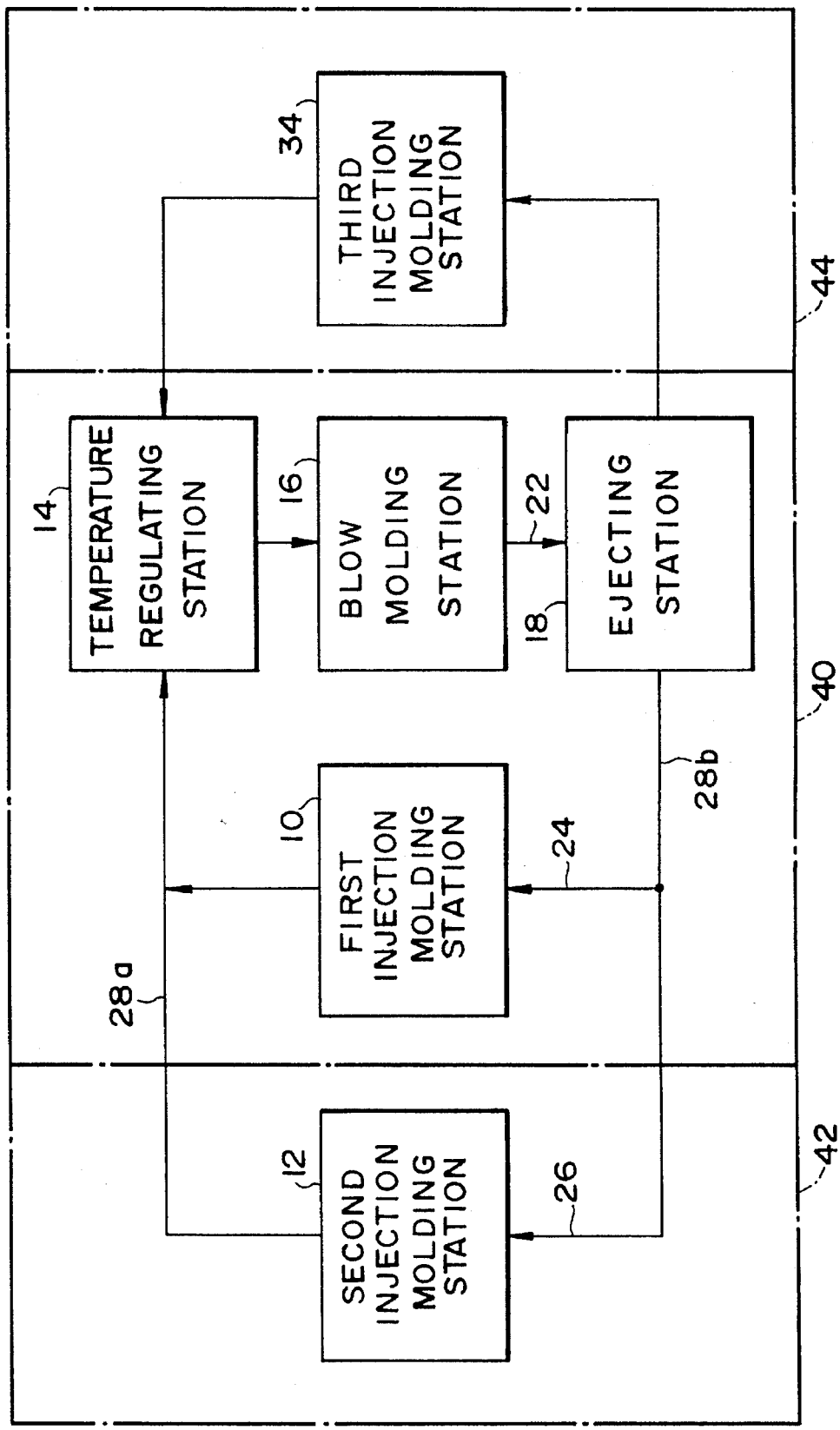
FIG. 6 is a plan view of a modified blow molding apparatus comprising a single blow molding station and three injection molding stations.
Figure 7:
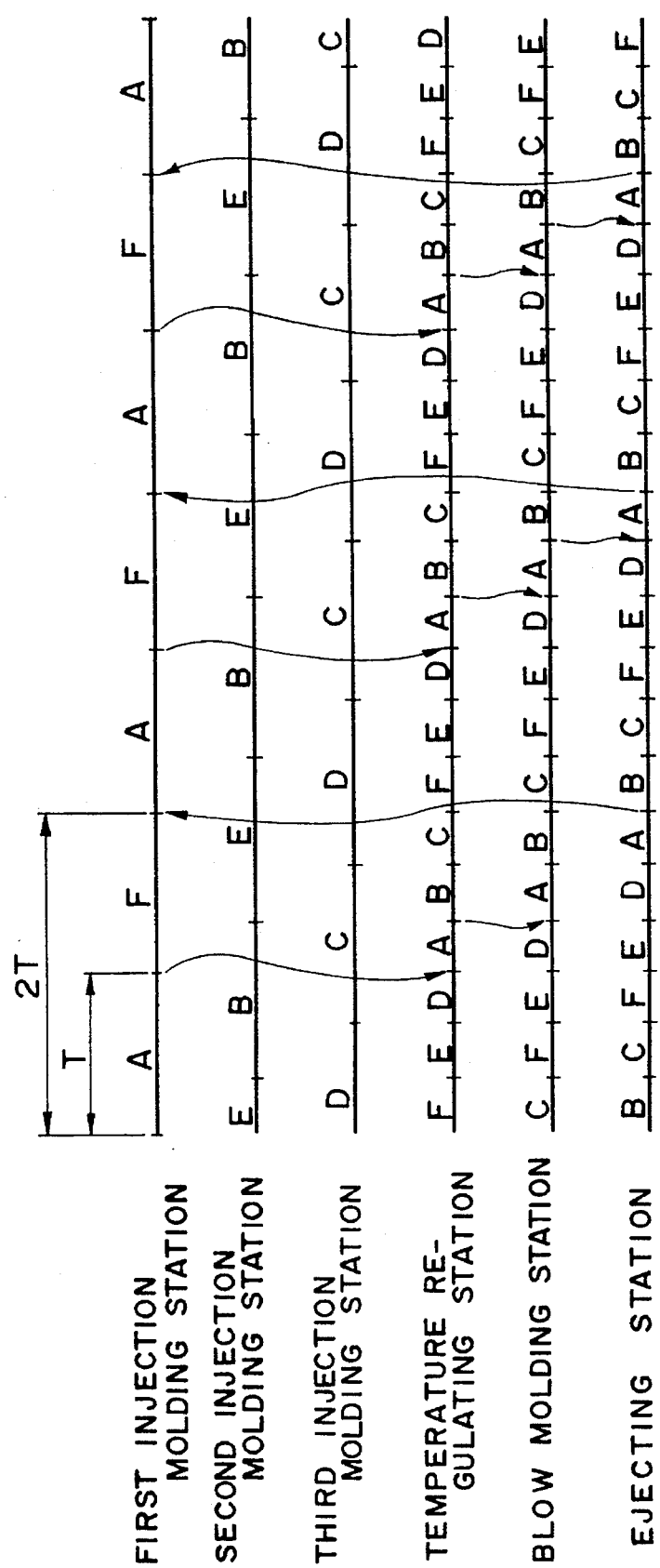
FIG. 7 is a timing chart illustrating the operation of the blow molding apparatus shown in FIG. 6.

As will be apparent from the timing charts shown in FIGS. 4 and 5, it is preferred that one of the injection molding stations 10 or 12 has its injection molding cycle time T, that each of the neck mold moving units 20 has its time equal to 2.5T which is required to circulate through all the stations and that the processing time required by the temperature regulating station 14, blow molding station 16 and ejecting station 18 is within time equal to 1.5T. Time required by the ejecting station 18 including the ejecting time T8 and the conveyance times T9 before and after the ejecting time T8 may be sufficient to be T/2. Therefore, each of the temperature regulating station 14 and blow molding station 16 can assure its processing time equal to T/2. In order that the neck mold moving unit 20 conveyed out of one of the first and second injection molding stations 10 and 12 which is operated at the injection molding start time different from that of the other injection molding station by the time delay equal to T/2 is always placed in the temperature regulating station 14 after the passage of a given time period, it is required that the cycle times at the temperature regulating station 14 and the subsequent blow molding station 16 are within the above time difference T/2. If the respective process is not terminated within this time period, the number of blow molding stations for one injection molding station may be increased. For example, the system may have three injection molding stations and two blow molding stations. If the cycle time in each of the temperature regulating station 14 and blow molding station 16 can be further reduced, three or more injection molding stations may be provided for one temperature regulating station 14 and one blow molding station 16. FIG. 6 shows an arrangement in which the first, second and third injection molding stations 10, 12 and 34 are provided. In such an arrangement, a further additional unit 44 is connected to the molding unit 40 and additional unit 42. The operation of the molding apparatus shown in FIG. 6 is illustrated in a timing chart of FIG. 7. As shown, one of the three injection molding stations 10, 12 and 34 has a time delay T/3 in its injection molding start time from the directly adjacent injection molding station. The cycle time in each of the temperature regulating station 14 and blow molding station 16 is set to be terminated within the time delay T/3. Thus, the number of products per unit time can be increased triply more than that of the prior art. If the number of neck mold moving units 20 is six equal to the total number of stations, the number of neck mold moving units 20 can be reduced one-half less than that of the prior art (6 units/12 units).

It is to be understood that the present invention is not limited to the aforementioned embodiments, but may be carried out in various modified configurations within the concept of the invention.

Figure 8:
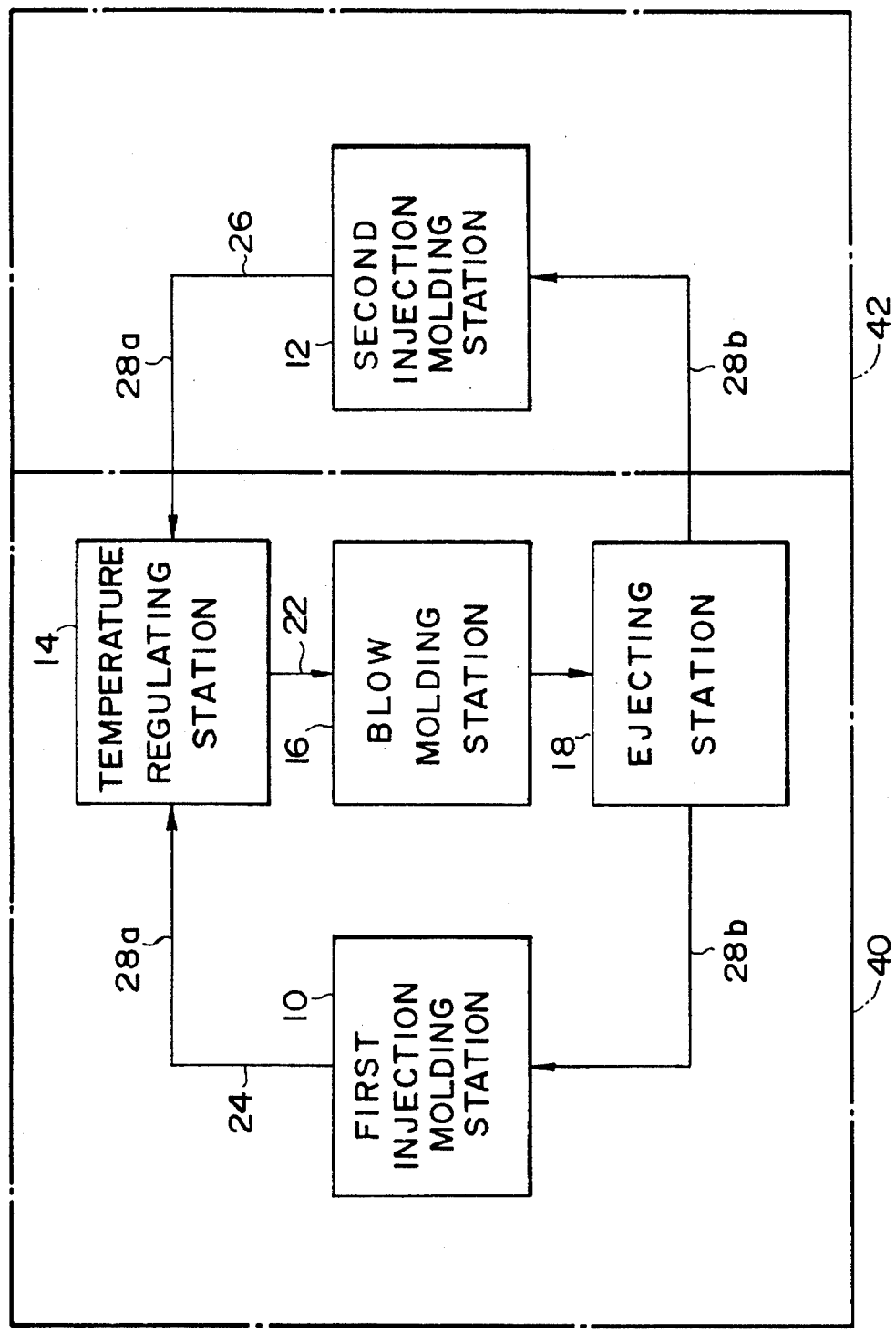
FIG. 8 is a plan view illustrating an layout of two injection molding stations which is different from that of FIG. 2.

For example, such a layout as shown in FIG. 8 may be taken to arrange the first and second injection molding stations 10 and 12. In this figure, the additional unit 42 is connected to the molding unit 40 on its right side. In such a layout, the distance from one of the first and second injection molding stations 10 or 12 to the temperature regulating station 14 can be set to be equal to the distance from the other injection molding station 12 or 10 to the temperature regulating station 14. Similarly, the return distance between the ejecting station 18 and one of the first and second injection molding stations 10 or 12 can be equal to that between the ejecting station 18 and the other injection molding station 12 or 10. In such a line symmetrical layout, the positional relationship between the first conveyance line and the second conveyance line can be equal to that between the first conveyance line and the third conveyance line. Therefore, two conveyance loops can realize the completely same conveyance cycle.

As described, three injection molding stations may be provided for two temperature regulating stations. Such a layout is exemplified in FIG. 9. The system comprises two molding units 40, one of which is connected to an additional unit 42. The time difference t of the injection start time in the three injection molding stations may be set to be t=2T/3. The working cycle time in each of the temperature regulating station 14 and blow molding station 16 may be set to be within 2T/3. In short, if injection molding stations of M in number are provided for blow molding stations of N in number (N<M), the difference t of the injection start time in each of the injection molding stations may be t=N×T/M while the working cycle time in each of the temperature regulating and blow molding stations 14 and 16 may be set to be within the time difference t.

Figure 9:
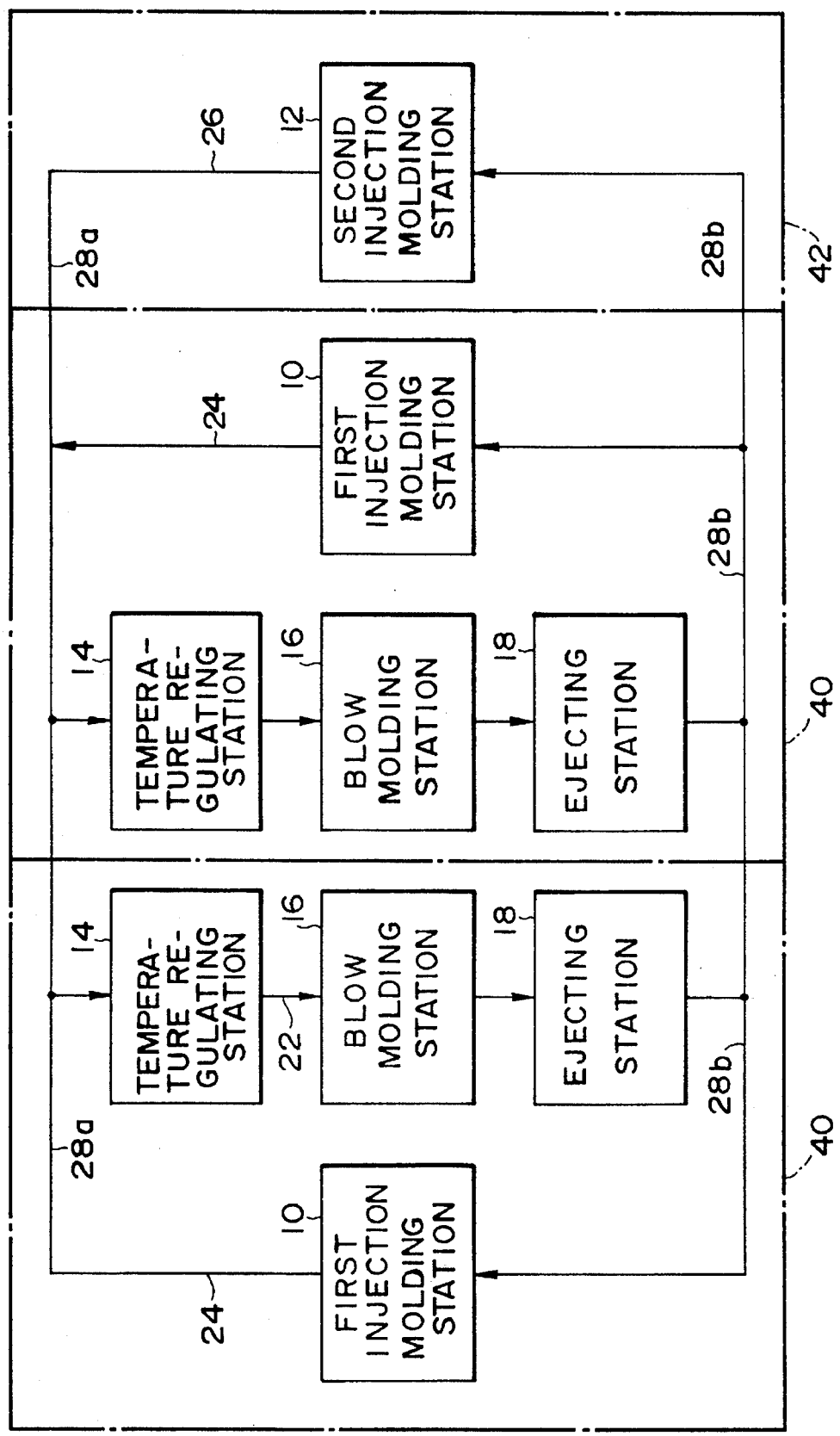
FIG. 9 is a plan view of another modified blow molding apparatus which comprises two blow molding stations and three injection molding stations.

Although the number of neck mold moving units 20 is set to be equal to the total number of stations in each of the blow molding systems shown in FIGS. 2, 8 and 9, one neck mold moving unit 20 more than the total number of stations may be used, if necessary. Particularly, if a plurality of injection molding stations are disposed in the first conveyance line 22 with different conveyance distances, as shown in FIGS. 2 and 9, one excess neck mold moving unit 20 may be provided to realize the smooth conveyance cycle. The excess neck mold moving unit 20 may be placed on any conveyance line other than the stations, for example, at a stand-by position in front of an injection molding station. More particularly, since the layout in each of the illustrated embodiments does not require any return conveyance path formed through such a long distance as described in Japanese Patent Laid-Open No. Hei 3-159726, it is sufficient to provide the number of neck mold moving units 20 which is equal to the total number of stations plus one. This can maintain the number of expensive neck mold moving units 20 minimum.

Figure 10:
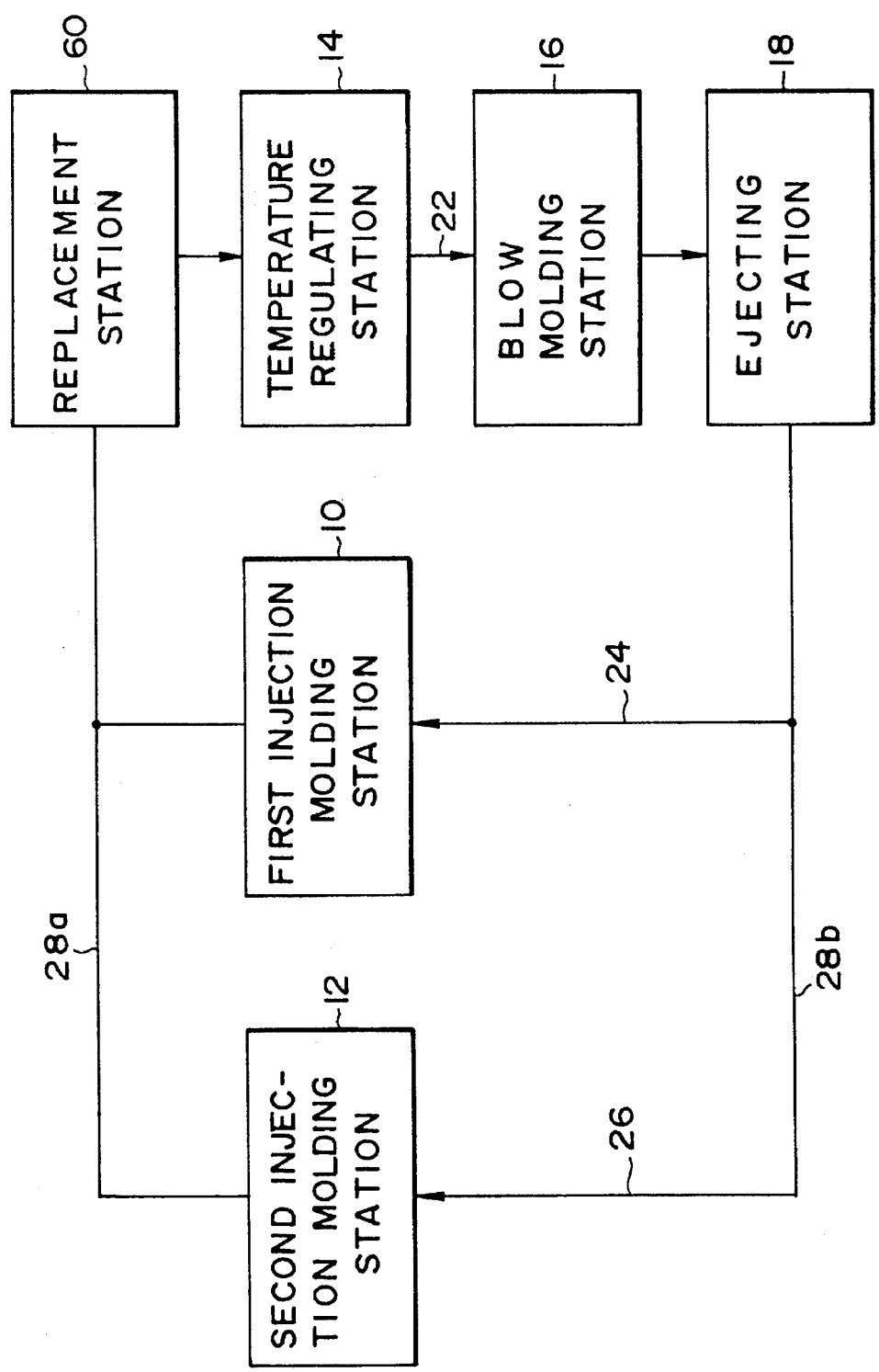
FIG. 10 is a plan view of a further modified blow molding apparatus in which one neck mold moving unit more than the total number of processing stations is used.

A layout in which one excess neck mold moving unit 20 more than the total number of processing stations is provided is shown in FIG. 10. The layout includes a replacement station 60 disposed in the first conveyance line 22. The replacement station 60 does not perform any substantial process, but is adapted to hold a neck mold moving unit 20 for a slight time until the blow molding station 14 will be able to receive that neck mold moving unit 20. The layout includes six neck mold moving units 20. Thus, one excess neck mold moving unit 20 will always exist in the supply and conveyance line 28 or the replacement station 60 in addition to five neck mold moving units 20 which are disposed in the stations 10, 12, 14, 16 and 18, respectively. Immediately before the operation in the blow molding station 14 terminates, the excess neck mold moving unit 20 will reach the replacement station 60 with a margin.

The present invention may be applied to an apparatus for performing the blow molding step immediately after the injection molding step, without any temperature regulating station 14. The present invention has been described as to a plurality of injection units which are independently disposed to the respective injection molding stations, but may be applied to a single injection unit which can selectively be switched to the respective one of the injection molding stations.

Figure 11:
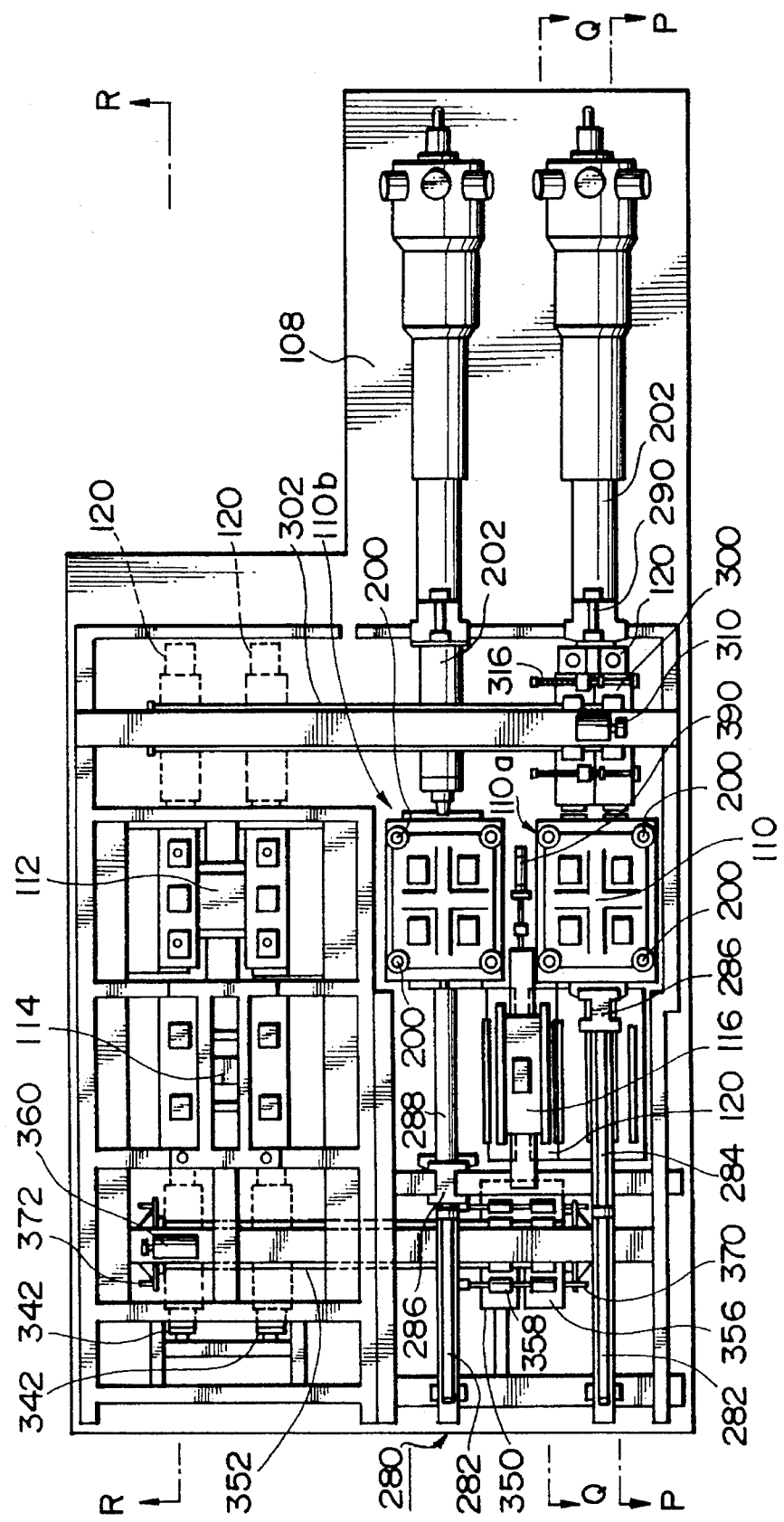
FIG. 11 is a schematic plan view of one embodiment of a blow molding apparatus constructed in accordance with the present invention.

Referring now to FIG. 11, there is shown the other embodiment of a molding apparatus constructed in accordance with the present invention. The molding apparatus comprises a bed 108 defining a neck plate conveyance path. Along the neck plate conveyance path, there are disposed two injection molding stations 110, a temperature regulating station 112, a blow molding station 114 and an ejecting station 116. The two injection molding stations include first and second injection molding stations 110a and 110b for injection molding preforms. The ejecting station 116 is located in an area adjacent to both the first and second injection molding stations 110a and 110b and at a middle position from which the ejecting station is spaced away from both the first and second injection molding stations 110a and 110b by the same neck plate conveyance distance.

Figure 13:
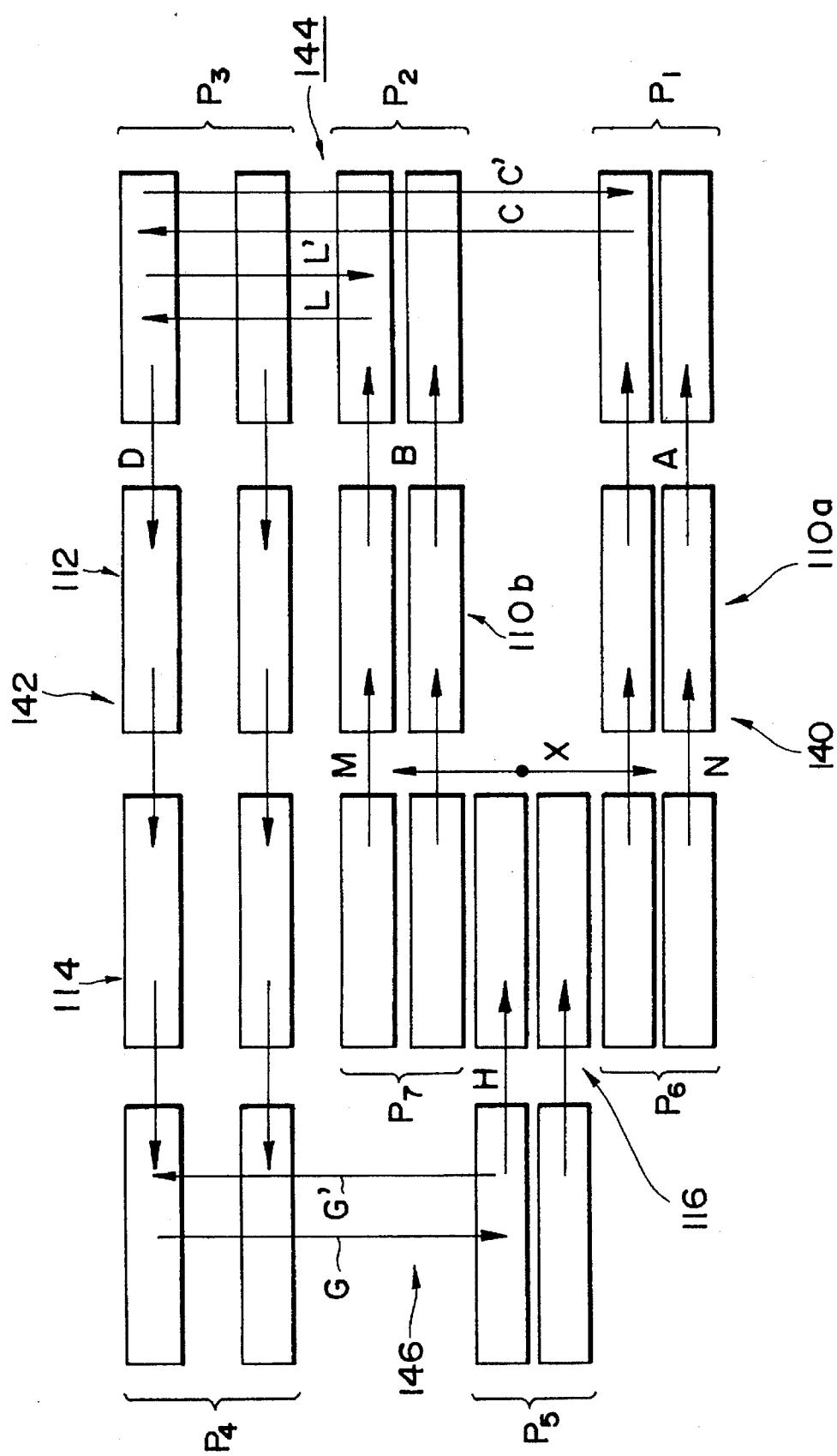
FIG. 13 is a schematic view illustrating the procedure of conveying the neck plates in the blow molding apparatus of FIG. 11.

FIG. 12 shows a neck plate 120 which is adapted to move through the respective stations 110–116. FIG. 13 shows a procedure of movement of the neck plates 120. Referring to FIG. 12, the neck plate 120 comprises a pair of split plates 120a and 120b which are separatable from each other. The neck plate 120 also comprises a plurality of neck mold mounting apertures 122 (eight in the illustrated embodiment) which are equidistantly formed therein along the longitudinal axis. The neck plate 120 further comprises a cross groove 124 which is formed therein at each end. Each of the cross grooves 124 includes first positioning holes 126 formed therein. The cross grooves 124 are used in conveying the neck plate 120. The neck plate 120 is positioned in place by using the first positioning holes 126 in the injection molding stations 110a and 110b. The neck plate 120 further includes second positioning holes 128 which are used on positioning the neck plate 120 in the blow molding station 114.

Referring to FIG. 13, two parallel neck plates 120 are conveyed into the respective one of the stations 110–116. Therefore, each of the first and second injection molding stations 110a and 110b can comprise two lines of injection cavity mold each having eight cavities such that sixteen preforms can be injection molded in one shot. Thus, each of the other stations 112, 114 and 116 is also adapted to process sixteen preforms or bottles. The blow molding station 114 comprises two lines of blow cavity mold each having eight cavities.

As can be seen from FIG. 13, the neck plates 120 are conveyed along conveyance loops which are defined by the first, second, third and fourth conveyance lines 140–146. The first conveyance line 140 includes the first and second injection molding stations 110a, 110b and the ejecting station 116. In the first conveyance line 140, the conveyance step X and conveyance step M or N are performed after molded products has been ejected at the ejecting station 16. The neck plates 120 are then alternately moved into the first or second injection molding stations 110a or 110b. The second conveyance line 142 includes the temperature regulating station 112 and the blow molding station 114. The third conveyance line 144 is adapted to move the neck plates 120 from the first conveyance line 140 to the second conveyance line 142. The fourth conveyance line 146 is adapted to return the neck plates 120 from the second conveyance line 142 back to the first conveyance line 140.

Letters P1–P7 in FIG. 13 designate various dwell or standby positions of the neck plates 120. In the illustrated embodiment, the pitch between each pair of adjacent neck plates 120 is increased at conveyance steps C and L at which the neck plates 120 are conveyed from the dwell position P1 or P2 to the dwell position P3. On the contrary, the above pitch is decreased at a conveyance step G at which the neck plates 120 are moved from the dwell position P4 to the dwell position P5. The blow molding station 114 forms a bottle having a diameter larger than that of an injection molded preform. Thus, the blow molding station 114 requires a relatively large mold opening stroke. Thus, the pitch between two lines of blow cavity mold is set to be larger than that between two lines of injection cavity mold in the injection molding station 110. For such a reason, the pitch between each pair of adjacent neck plates 120 is variable during the conveyance. In other words, the pitch between the pair of adjacent neck plates 120 in each of the first and second injection molding stations 110a and 110b can be decreased to reduce the tie-bar distance. As a result, a neck moving plate 210 (which will be described later) for holding the neck plates 120 can be prevented from being deformed. Further, the reduction of tie-bar distance results in dimensional reduction of the entire system.

Figure 14:
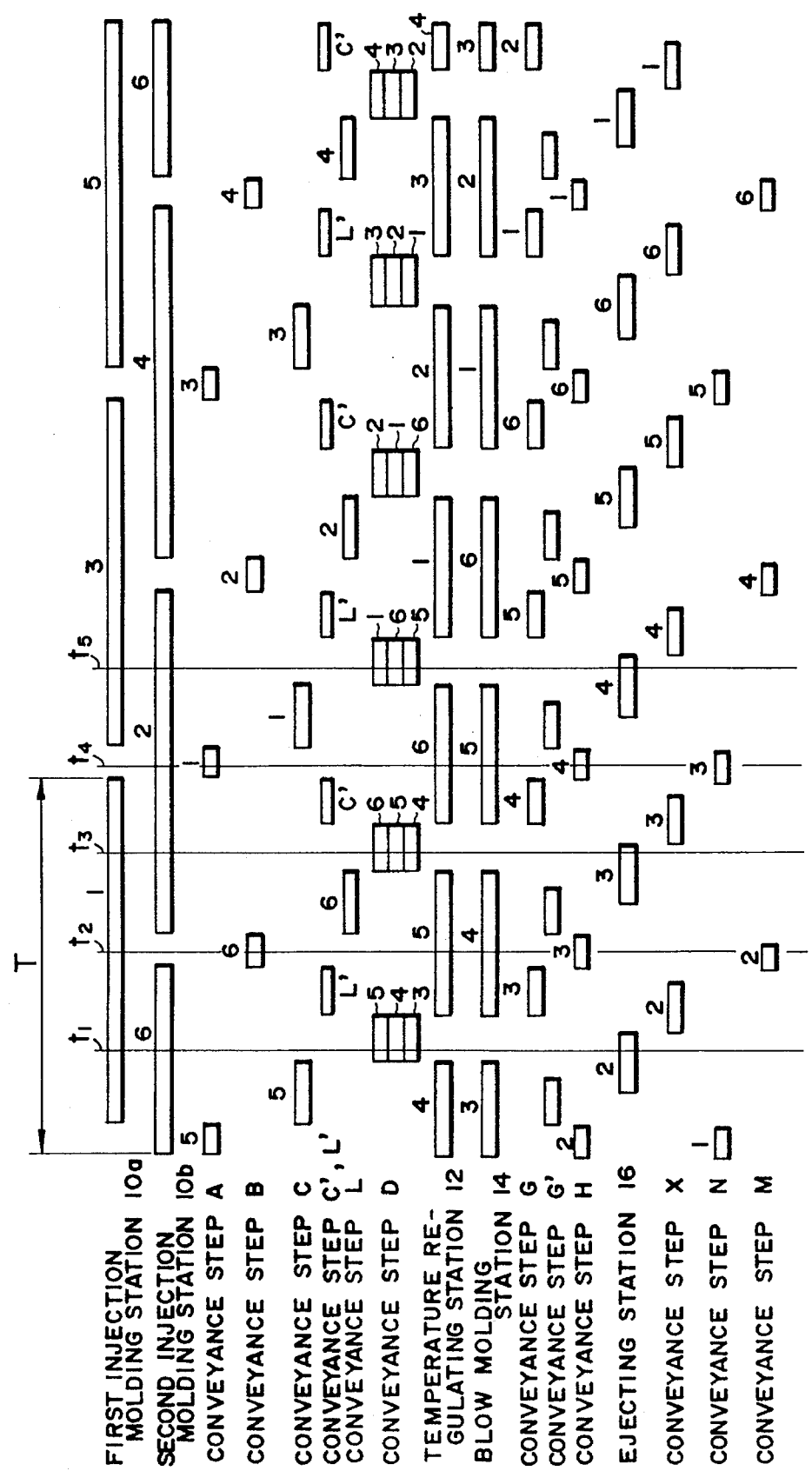
FIG. 14 is a timing chart of neck plates being conveyed in the blow molding apparatus of FIG. 11.

The procedure of conveyance of the neck plates 120 will be described also with reference to FIG. 14. In the illustrated embodiment, six pairs of neck plates 120 are provided for the total number of stations 110a, 110b, 112, 114 and 116 which is equal to five. Numerals 1–6 designate six pairs of neck plates. As will be apparent from FIG. 14, the first and second injection molding stations 110a and 110b are adapted to injection mold preforms with a time difference. Where the injection molding cycle time from the reception of the neck plates 120 to the discharge of the same neck plates 120 in each of the injection molding stations is T, a time difference equal to about T/2 is set on the preform injection molding start time in each of the first and second injection molding stations 110*a* and 110*b*. The processing time in each of the temperature regulating station 112 and blow molding-station 114 is set to be within T/2. The processing time in the ejecting station 116 may be a short time sufficient to open the neck plates 120 for removal of bottles out of the neck molds, as be well-known in the art.

Times t1–t5 in FIG. 14 will be described in details with reference to FIGS. 15A–15E.

Figure 15A:
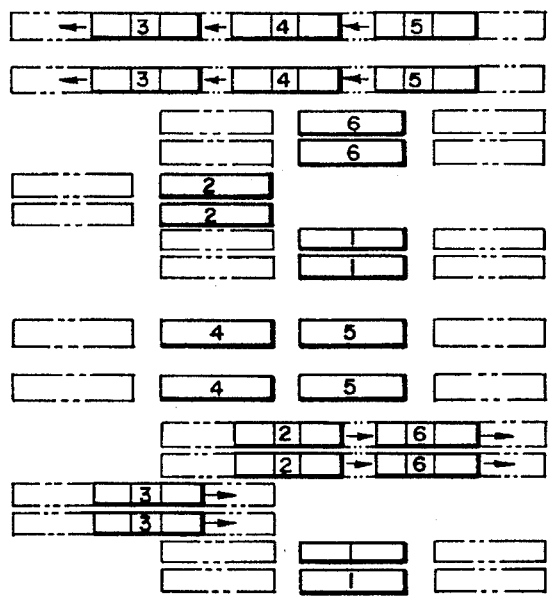

At the time t1, the first and second injection molding stations 110*a* and 110*b* respectively receive the first and sixth neck plate pairs 1 and 6 at their dwell positions and are respectively placed in the initial and final steps, as shown in FIG. 15A. At this time, the ejecting station 116 causes bottles to be ejected from the second neck plate pair 2. Further, the third, fourth and fifth neck plate pairs 3, 4 and 5, which have been placed at the blow molding station 114, temperature regulating station 112 and dwell position P3, are in their conveyance step D.

At the time t2, the first injection molding station 110*a* is in its final step using the first neck plate pair 1 while the second injection molding station 110*b* terminates its injection molding step using the sixth neck plate pair 6, with the conveyance step B to the dwell position P2 being carried out. The second neck plate pair 2 which has been placed in the ejecting station 116 at the time t1 is subjected to the conveyance step X before the time t2 and reaches the dwell position P7 opposed to the second injection molding station 110*b*. Thus, the conveyance step M is carried out at the same time as the above step B, so that the second neck plate pair 2 will be moved into the second injection molding station 110*b*. The fourth and fifth neck plate pairs 4 and 5 are being subjected to the processing steps in the blow molding station 114 and temperature regulating station 112, respectively. The third neck plate pair 3 has been already subjected to the conveyance step G from the dwell position P4 to the dwell position P5 and will be subjected to the conveyance step H from the dwell position P5 to the ejecting station 116.

Figure 15C:
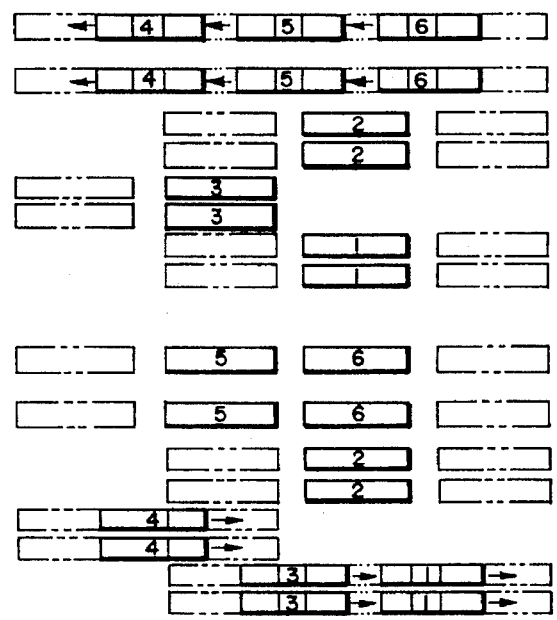
Figure 15E:
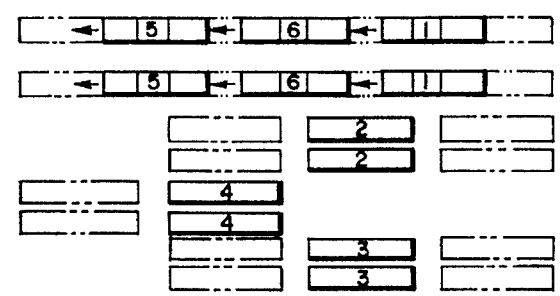

FIG. 15C showing the state of operation at the time t3 is substantially the same as in FIG. 15A except that the first injection molding station 110*a* is in its final stage while the second injection molding station 110*b* is in its initial stage. The sixth neck plate pair 6, which has been moved from the second injection molding station 110*b* to the dwell position P2, is subjected to the conveyance step L to the dwell position P3 before reaching the time t3. At the time t3, the sixth neck plate pair 6 is subjected to the conveyance step D together with the fourth and fifth neck plate pairs 4 and 5. The conveyance step L for the sixth neck plate pair 6 is performed by a first conveyance unit 300 shown in FIG. 11. The first conveyance unit 300 will be subjected to the return conveyance step C' between the times t3 and t4 since it is subsequently required to receive the neck plate pair conveyed from the first injection molding station 110*a* to the dwell position P1. Similarly, a second conveyance unit 350 shown in FIG. 11 is used in the conveyance step G between the dwell positions P4 and P5. The return conveyance step G' is performed between the times t2 and t3.

FIG. 15D showing the working state at the time t4 is similar to FIG. 15B except that the third neck plate pair 3 placed at the dwell position P6 is then moved into the first injection molding station 110*a* while at the same time the first neck plate pair 1 placed in the first injection molding station 110*a* is moved to the dwell position P1. At the subsequent time t5, the work shown in FIG. 15E will be performed. This is completely the same state as that of FIG. 15A except that the neck plate pair is denoted by a different reference numeral. The respective works will be repeated to perform a series of molding cycles using the neck plate pairs 1–6 in accordance with the aforementioned procedure.

In the aforementioned embodiment, the ejecting station 116 is positioned in an area adjacent to both the first and second injection molding stations 110*a* and 110*b* and at a position from which the ejecting station 116 is spaced apart from both the first and second injection molding stations 110*a* and 110*b* by the same distance, for the following reason: Immediately after the blow molding station 114 has performed the blow molding step, the neck plate pair can be moved from the blow molding station 114 to the dwell position P4. More particularly, the second conveyance unit 350 received the neck plate pair at the dwell position P4 can make the conveyance step H immediately after the conveyance step G to move the neck plate pair held by the second conveyance unit 350 into the ejecting station 116. If the return step G' is immediately performed, the preforms can be placed at their stand-by position in front of the blow molding station 114. If the ejecting station 116 is located at the dwell position P4 or P5, the system would require time required to reciprocate the second conveyance unit 350 between the positions P4 and P5 plus the ejecting time. This means that a stand-by time period is required to move the neck plate pair 120 to the subsequent step immediately after the blow molding step. In the above layout, each of the first and second injection molding stations 110*a* and 110*b* can receive the neck plate pair 120 immediately after the injection molding step. This is because the distances between the first and second injection molding stations 110*a* and 110*b* and the blow molding station 114 become equal to each other and minimum.

In accordance with the present embodiment, thus, the two injection molding stations 110*a* and 110*b* can respectively perform the preform injection molding step with the time difference T/2 one-half less than the injection molding cycle time T. Thereafter, the preforms molded by the injection molding stations 110*a* and 110*b* can be conveyed to the subsequent station under equal conditions. Therefore, the quality of final products or bottles can be equalized and the working efficiency of blow molds in the blow molding station 114 can be increased twice.

The stations and associated conveyance and drive portions shown in FIG. 11 will be described also with reference to FIG. 16 and subsequent figures.

First and Second Injection Holding Stations 110*a* and 110*b*

A bed 108 supports two injection units 202 corresponding to the injection molding stations 110*a* and 110*b*. Each of the injection molding stations 110*a* and 110*b* includes four tie-bars 200 defining an area, and an injection cavity mold 204 disposed within said area. The injection cavity mold 204 comprises a hot runner block which is connected by a nozzle with the injection cavity mold 204, as shown in FIG. 16. An upper clamping plate 206 movable in the vertically direction is provided above the injection cavity mold 204. The upper clamping plate 206 supports injection core molds 208. Each of the injection molding stations 110*a* and 110*b* further includes a neck moving plate 210 which is disposed at an elevated position in which the neck plates 120 are conveyed into the injection molding station. The neck moving plate 210 includes guide rails of C-shaped cross-section (not shown) which are disposed at positions facing the opposite sides of the neck plate 120 and is adapted to receive the neck plates 120 from the dwell position P6 or P7 in the longitudinal direction. Each of the first and second injection molding stations 110*a* and 110*b* further includes pins which are to be inserted into the first positioning holes 126 in the neck plate 120. After the injection molding station 110*a* or 110*b* has been positioned through these pins, the upper clamping plate 206 and neck moving plate 210 are downwardly moved to clamp the injection molds so that preforms 130 can be injection molded.

Temperature Regulating Station 112

The temperature regulating station 112 also includes guide rails (not shown) located at an elevated position in which the neck plates 120 are to be moved thereinto. The guide rails are stationary. A temperature regulating core 220 is disposed above the guide rails while a temperature regulating pot 224 is located below the guide rails. The temperature regulating core 220 can be moved in the vertical direction by a temperature regulating core cylinder 222 while the temperature regulating pot 224 can be moved in the vertical direction by a temperature regulating pot cylinder 226. When the temperature regulating core 220 is downwardly moved while the temperature regulating pot is upwardly moved, they can hold preforms 130 moved into the temperature regulating station 112 therebetween for regulating the temperature of the preforms into an appropriate stretching level.

Blow Molding Station 114

Figure 18:
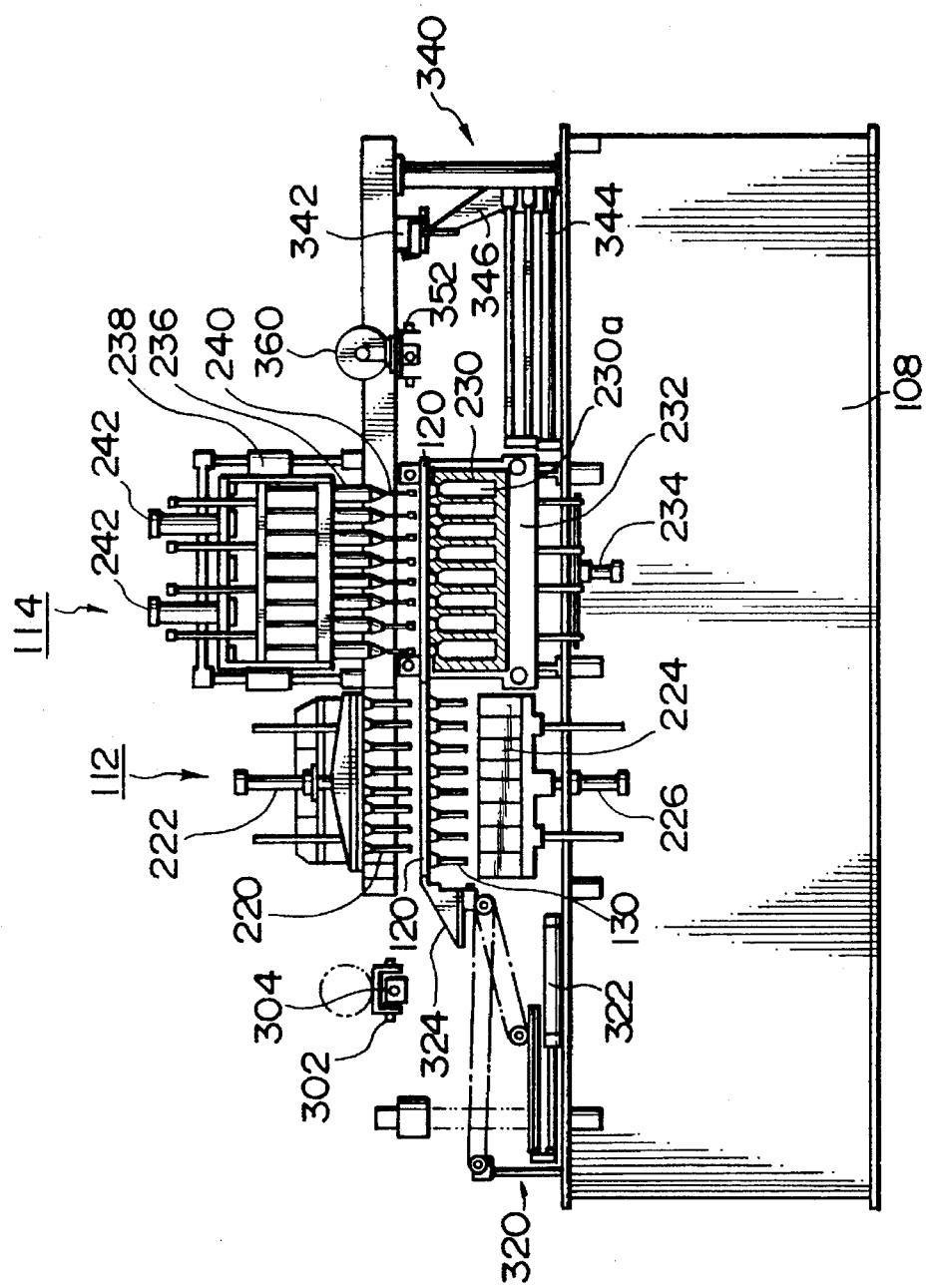
FIG. 18 is a cross-sectional view taken along a line R—R in FIG. 11.

The blow molding station 114 also includes guide rails (not shown) for receiving the neck plates 120. In the temperature regulating and blow molding stations 112 and 114, the neck plates 120 are held in end-abutting relationship therebetween. Below the neck plates 120, there are disposed a blow cavity mold 230, a clamping unit 232 and a bottom mold cylinder 234, as shown in FIG. 18. The blow cavity mold 230 comprises a pair of split molds (only one shown) which have blow cavities 230*a*. Above the neck plates 120, there are disposed a blow core driving unit 238 for moving blow core molds 236 in the vertical direction and rod driving cylinders 242 for moving stretching rods 240 in the vertical direction. In the blow molding station 114, after the blow cavity molds 230, bottom molds (not shown), blow core molds 236 and stretching rods 240 have been clamped, the stretching rods are driven along their longitudinal axes and blow air is introduced into the interior of each of the preforms 130. Thus, the preforms 130 will be biaxially stretched and blow molded into bottles 132. It is noted that the blow molding station 114 includes positioning rods to be inserted into the second positioning holes 128 in the neck plates 120.

Ejecting Station 116

Figure 17:
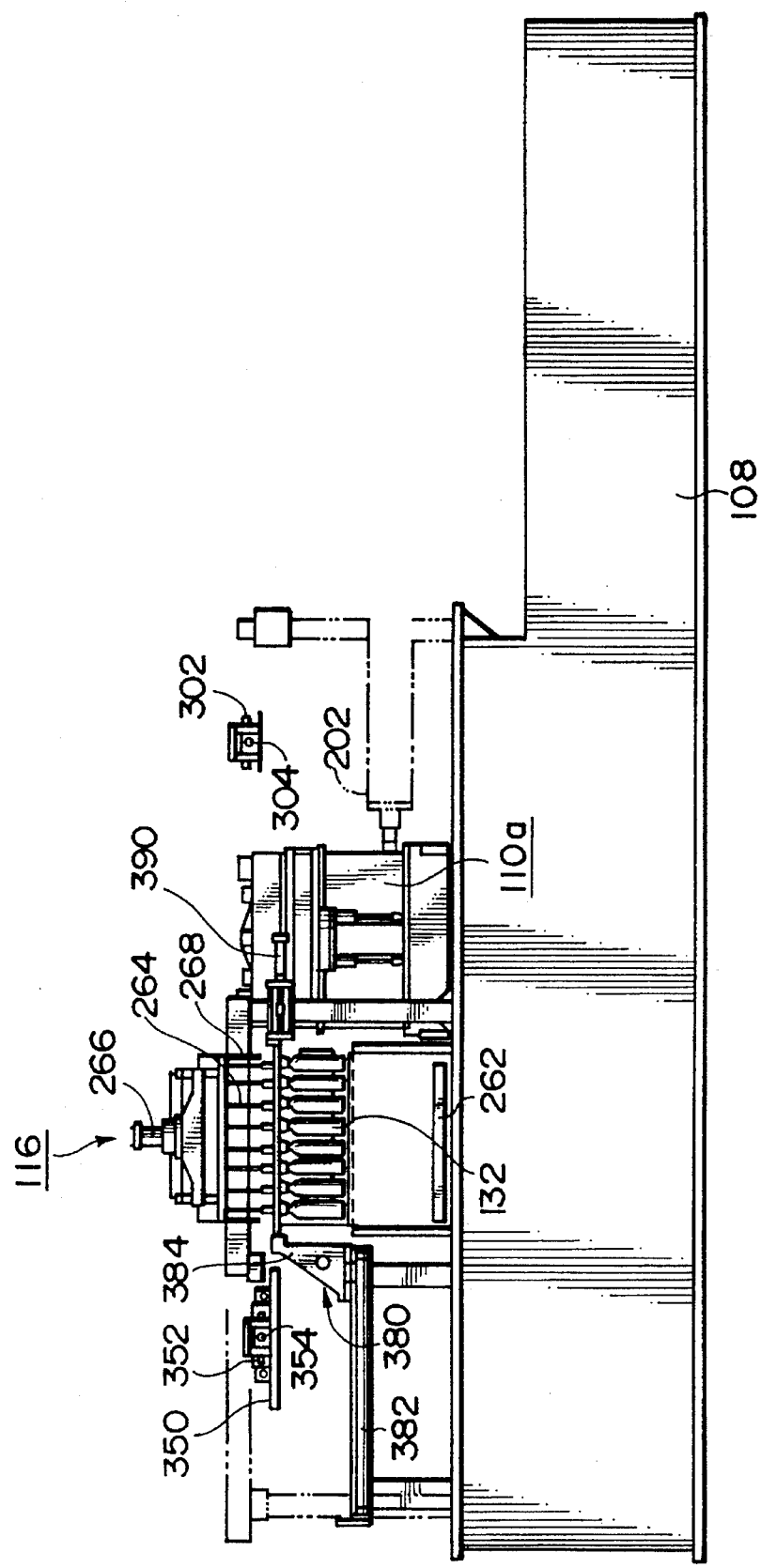
FIG. 17 is a cross-sectional view taken along a line Q—Q in FIG. 11.
Figure 19:
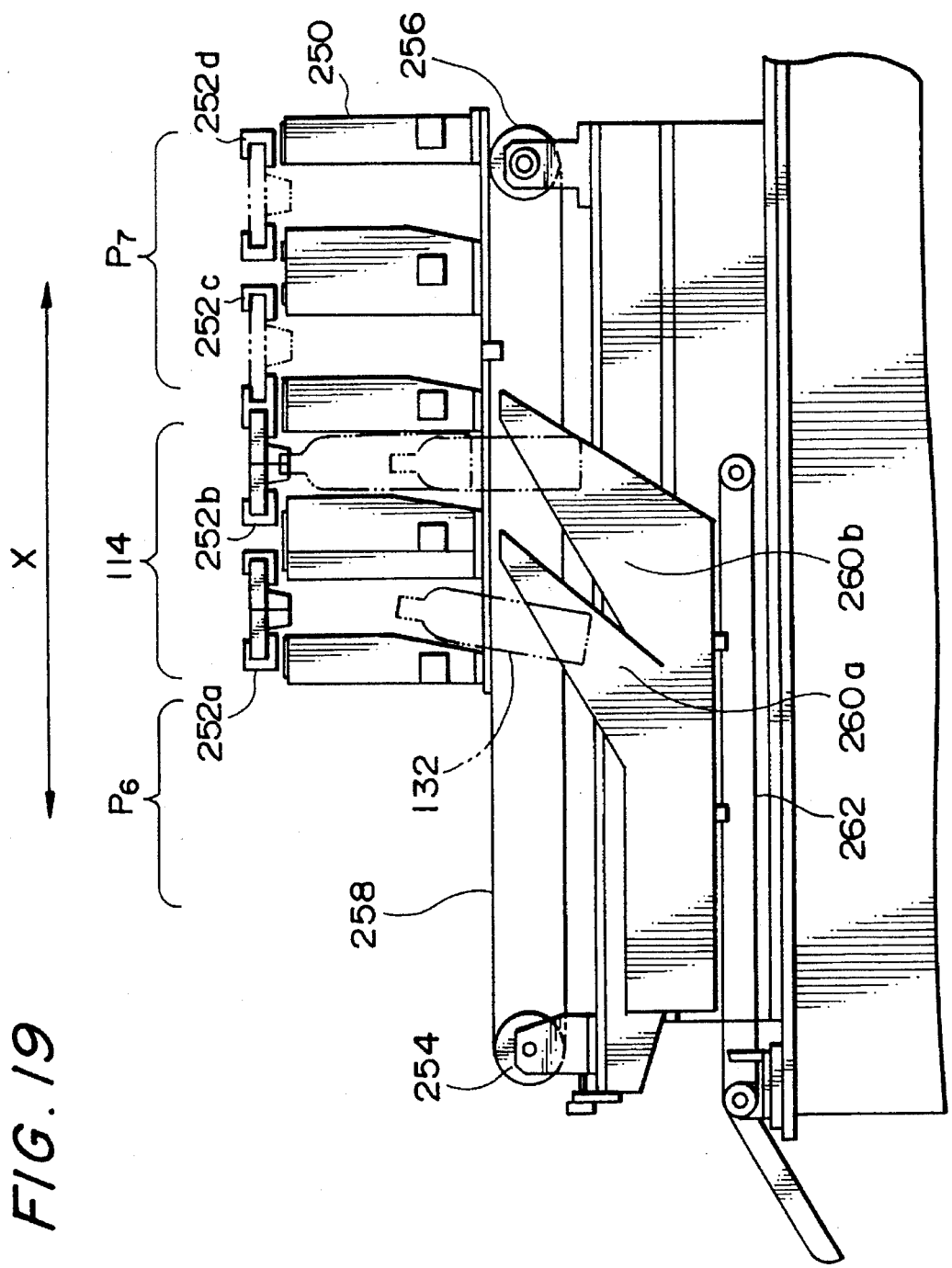
FIG. 19 is a schematic view of the ejecting station in FIG. 1.

The ejecting station 116 includes a framework 250 as shown in FIG. 19. Four guide rails 252*a*–252*d* are disposed on the top of the framework 250. The framework 250 is fixedly connected to an endless belt 258 which is spanned between drive and driven pulleys 254, 256. When these pulleys 254 and 256 are rotated, the framework 250 can be moved in the opposite directions shown by double-headed arrow X in FIG. 19. Under such a condition as shown in FIG. 19, the neck plates 120 supported by the first and second guide rails 252*a*, 252*b* are positioned in the ejecting station 114 while two remaining neck plates 120 are positioned in the dwell position P7. When the framework 250 is moved leftward as viewed in FIG. 19, the neck plates 120 held by the third and fourth guide rails 252*c*, 252*d* are disposed in the ejecting station 114 while two remaining neck plates 120 are located in the dwell position P6. Two discharge chutes 260*a* and 260*b* are located in an area that is below the framework 250 and opposite to the ejecting station 114. These chutes function to conduct molded bottles 132 from the neck plates 120 onto a belt conveyor 262. On the other hand, an area above the ejecting station 116 contains ejecting rods 264 driven by an ejecting cylinder 266 as shown in FIG. 17 and wedge-shaped ejection cams 268 that are downwardly driven into ejection notches 129 formed in the neck plates 120. The first-fourth guide rails 252*a*–252*d* are openably supported on the framework 250 so that when the ejection rods 264 and ejection cams 268 are driven, each of the neck plates 120, which comprises a pair of split plates 120*a*, 120*b*, can be opened with the guide rails.

Figure 20:
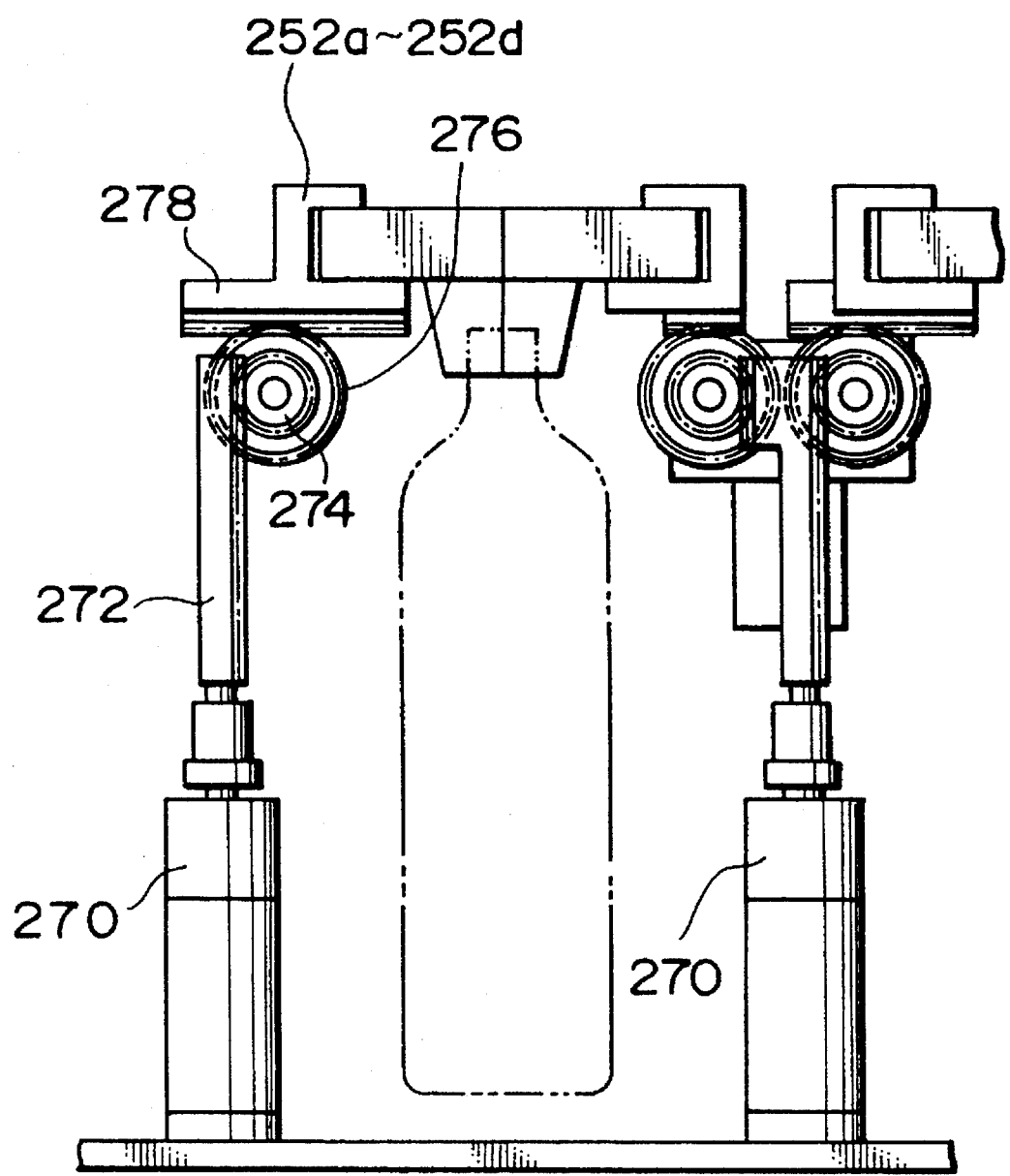
FIG. 20 is a schematic view of a mechanism for opening and closing the neck plates.

In order to prevent the neck plates 120 reduced in flexural rigidity by stamping from being deformed on the drive of the ejecting rods 264, the present embodiment includes a mechanism for opening and closing the guide rails, as shown in FIG. 20. The mechanism comprises first racks 272 each driven by a neck plate opening and closing cylinder 270 and engaged by a first pinion gear 274. A second pinion gear 276 is mounted coaxially relative to the first pinion gear 274 and engaged by a second rack 278 that is formed on the bottom of each of the guide rails 252. As a result, the guide rails 252 can be opened or closed through the first and second racks 272, 278 and also through the first and second pinion gears 274, 276 when the neck plate opening and closing cylinder 270 is actuated synchronously with the actuation of the ejection rods 274. This can relieve the load on the neck plates 120 in the ejecting step.

Device for Performing Conveyance Steps N and M

Figure 21:
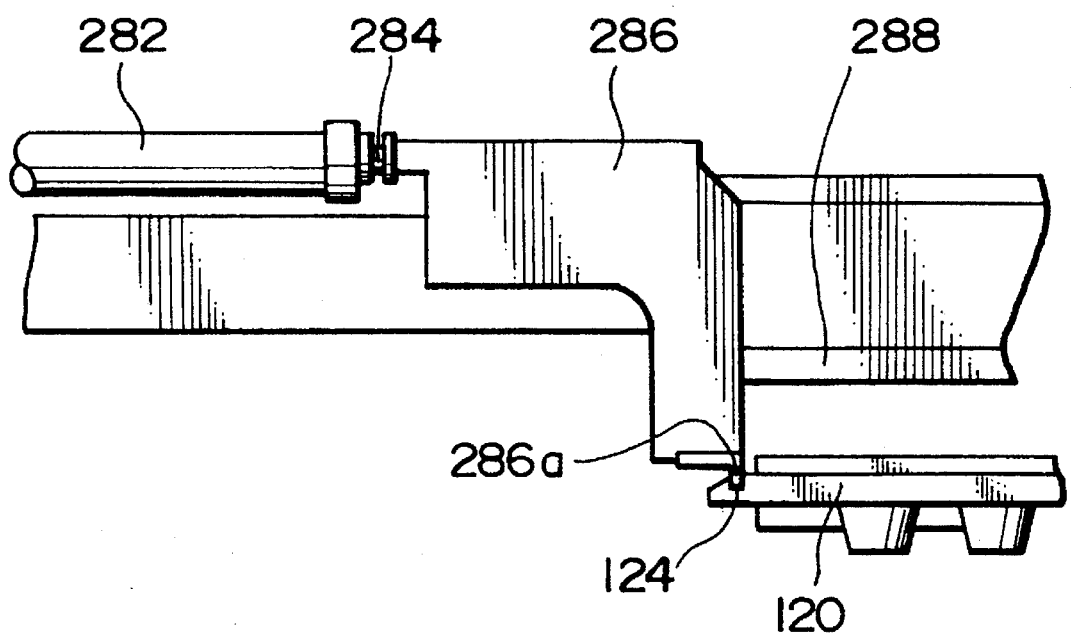
FIG. 21 is a view of the details of the first urging unit for carrying out the conveyance step N or M in FIG. 13.

As shown in FIGS. 11, 16 and 21, such a device comprises a first urging unit 280 and a first cushioning unit 290. The first urging unit 280 comprises a cylinder 282 having a piston rod 284 and an urging piece 286 that is mounted on the outermost end of the piston rod 284. The urging piece 286 is moved and guided along linear guides to urge a neck plate 120 in the dwell position P6 or P7 at one end such that all the neck plates 120 in the first and second injection molding stations 110*a* and 110*b* will be moved forwardly. As shown in FIG. 21, the urging piece 286 has an urging plate 286*a* that has a thickness sufficient to be inserted into the groove 124 in the neck plate 120. The urging plate 286*a* is held at a stand-by position opposite to the groove 124 in the neck plate 120 when that neck plate 120 is placed in the ejecting station 116. When the neck plate 120 is moved in the direction shown by arrow X in FIG. 13, the urging plate 286*a* is inserted into the groove 124 in the neck plate 120. Thereafter, the cylinder 282 is actuated to extend the piston rod 284 so that the neck plate 120 will be moved from the dwell position P6 or P7 through the urging piece 286 and urging plate 286*a*.

The first cushioning unit 290 is located in front of the neck plate 120 that is subjected to the conveyance step N or M through the first urging unit 280. The first cushioning unit 290 is also disposed in the first conveyance unit 300 that performs the conveyance steps C, C', L and L' shown in FIG.

Figure 24:
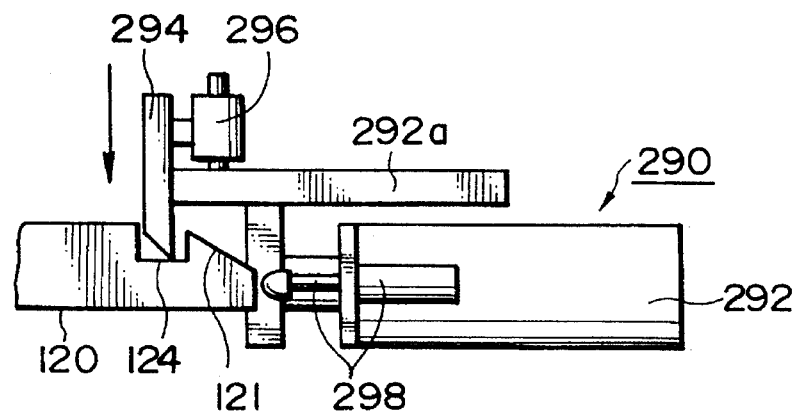
FIG. 24 is an enlarged view of the first cushioning unit in the first conveying unit.

13. The exact position of the first cushioning unit 290 is a position opposite to the forward end of the conveyance step M or N, as shown in FIG. 11. The cushioning unit 290 comprises a movable plate 292a that is driven by a cylinder 292 and includes a withdrawing plate 294 connected thereto through a holding member 296 as shown in detail in FIG. 24. The withdrawing plate 294 is biased by the holding member 296 in a direction shown by arrow in FIG. 24 at all times. The first cushioning unit 290 further comprises a shock absorber 298 connected thereto at a position opposite to the forward end of the neck plate 120. The cylinder 292 may be of a short-stroke type (e.g. about 5 mm stroke) and a withdrawing plate 294 is placed at a stand-by position forward 5 mm than a position in which the neck plate 120 reaches the dwell position. When the neck plate 120 comes into that position, the withdrawing plate 294 will be fitted into the groove 124 thereof. This fitting can easily be accomplished by forming the withdrawing plate 294 into a tapered configuration by which it is easily guided along the forward tapered end 121 of the neck plate 120 and also by biasing the holding member 292 downward through any suitable spring means. Immediately after the withdrawing plate 294 has been fitted into the groove 124, the cylinder 292 can be retracted to absorb any impact created when the neck plate 120 is stopped. Such a shock absorbing action can also be assured by the shock absorber 298.

Device for Carrying Out the Conveyance Steps C, C', L and L'

These conveyance steps are realized by the first conveyance unit 300 shown in FIGS. 11, 16, 22 and 23. The first conveyance unit 300 can be reciprocated along a linear guide 302.

Figure 22:
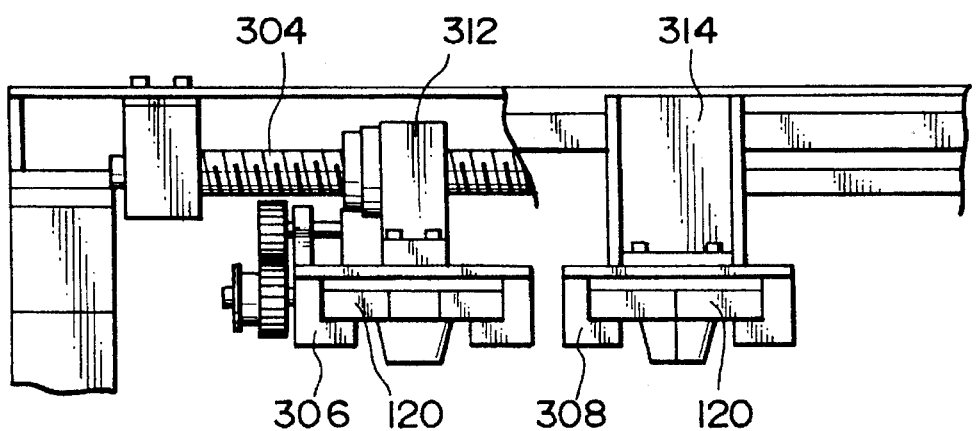
FIG. 22 is a schematic view of the first conveying unit for performing the conveyance steps C, C', L and L' in FIG. 13.
Figure 23:
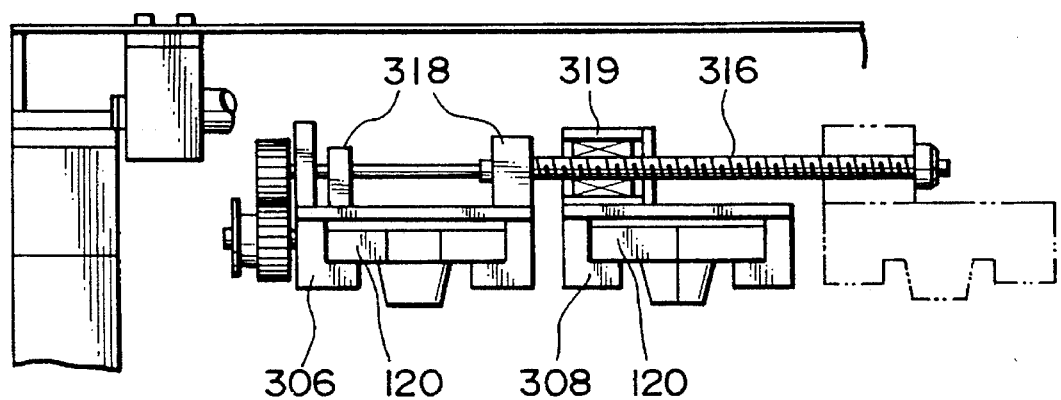
FIG. 23 is a schematic view of the pitch varying mechanism in the first conveying unit of FIG. 22.

Referring to FIGS. 22 and 23, the first conveyance unit 300 comprises two guide rails 306 and 308 for receiving the neck plates 120 at the dwell positions P1 and P2 shown in FIG. 13. A screw shaft 304 for moving the guide rails 306 and 308 is located along the linear guide 302. The screw shaft 304 is driven by a servomotor 310. One of the guide rails 306 fixedly supports a ball-nut arrangement 312 that is screwed by the screw shaft 304. The other guide rail 308 will not be driven directly by the screw shaft 304 and includes a portion 314 guided by the linear guide 302.

As described, the pitch between a pair of adjacent neck plates 120 is variable during conveyance from the dwell positions P1 and P2 to the dwell position P3. To this end, two screw shafts 316 are provided to vary the pitch between the two guide rails 306 and 308. The guide rail 306 has a bearing portion 318 for the screw shaft 316 while the other guide rail 308 has a ball-nut arrangement 319 screwed by the screw shaft 318. After the two guide rails 306 and 308 have received the pair of neck plates 120 at the dwell position P1 or P2, the pitch varying screw shafts 316 are driven by a servomotor 313 during conveyance to the dwell position P3 under the action of the servomotor As a result, the pitch between the pair of neck plates 120 can be increased. IF the screw shafts 316 are rotated in the opposite direction at the return steps C' and L', the pitch can be decreased.

Device for Carrying Out Conveyance Step D

Figure 25:
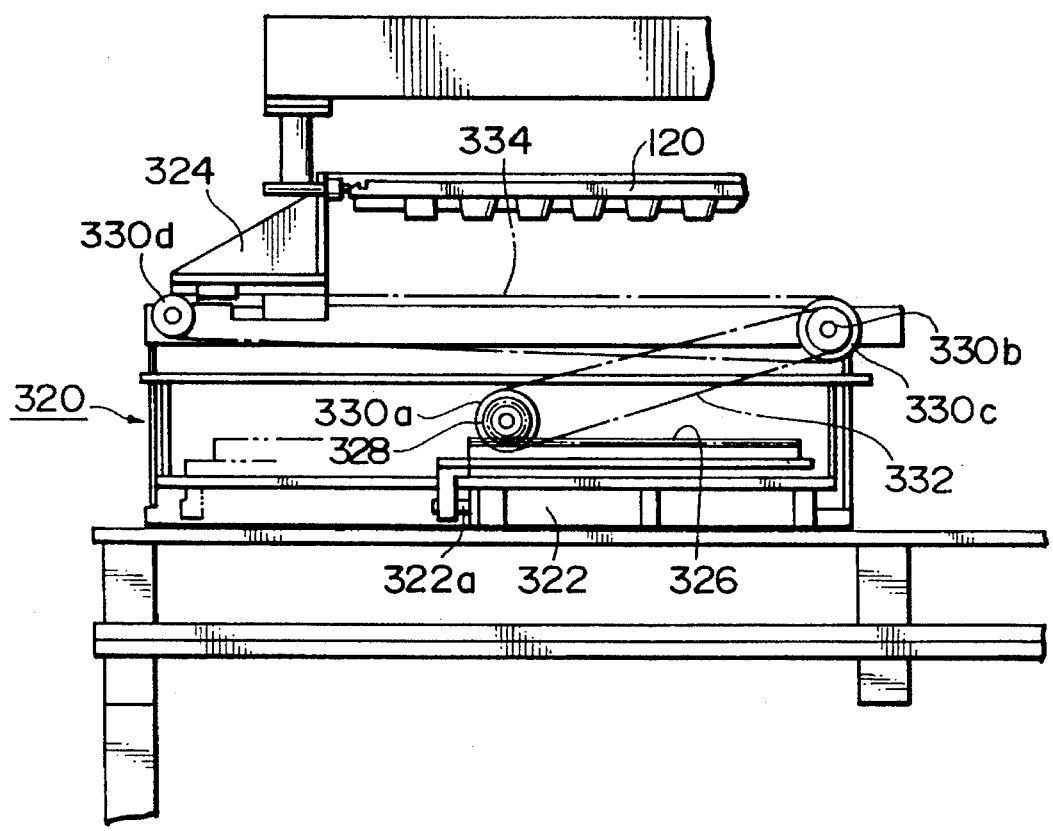
FIG. 25 is an enlarged view of the second urging unit for carrying out the conveyance step D shown in FIG. 13.

As shown in FIGS. 18 and 25, this device comprises a second urging unit 320 and a second cushioning unit 340. The second urging unit 320 is driven by a cylinder 322 to move an urging piece 324 forward. The urging piece 324 is adapted to urge the rearward end of the neck plate 120 existing in the dwell position P3 so that all the six neck plates 120 existing in the dwell position P3, temperature regulating station 112 and blow molding station 114 will be moved forward. As shown in FIG. 25, a mechanism for driving the urging piece 324 comprises a rack 326 which is driven forward and rearward by a rod 322a in a cylinder 322. The rack 326 engages a pinion gear 328 which is fixedly mounted coaxially relative to a first pulley 330a. A second pulley 330b is mounted coaxially relative to a third pulley 330c and for rotation with the third pulley 330c. A belt 332 is spanned between the first and second pulleys 330a and 330b. A fourth pulley 330d is disposed at a position spaced away from the third pulleys 330c by a distance substantially corresponding to the stroke of the urging piece 324. The urging piece 324 is fixedly mounted on a belt 334 which is spanned between the third and fourth pulleys 330c and 330d.

The second cushioning unit 340 is disposed at the stand-by position P4 shown in FIG. 18. The second cushioning unit 340 comprises a cushioning block 342 that has the withdrawing plate 294 and the shock absorber 298 in the first cushioning unit 290. However, the second cushioning unit 340 is movable through a stroke corresponding to the longitudinal length of the neck plates 120, rather than the short-stroke movement as in the first cushioning unit 290. To this end, an arm 346 is provided which is driven by a rodless cylinder 344. The arm 346 is fixedly connected to the cushioning block 342.

To carry out the conveyance step D of FIG. 13, the second urging unit 320 is driven to urge the rearward ends of the neck plates 120 existing at the dwell position P3. At this time, the second cushioning unit 340 is in its stand-by position adjacent to the outlet of the blow molding station 114. When the neck plates 120 existing in the blow molding station 114 are driven out, the withdrawing plate 294 of the cushioning block 342 engages in the groove 124 of the neck plate 120. Under such a state, the rodless cylinder 344 is actuated to withdraw the neck plates 120 at a speed slightly lower than that of the cylinder 322. By performing the drive along the conveyance path, three neck plates 120 connected together in the longitudinal direction can be moved in a stable manner. By overdriving the second cushioning unit 340, the forward end of the neck plates 120 placed at the dwell position P4 can be separated from the forward end of the neck plates 120 in the blow molding station 114 by a slight distance.

Device for Carrying Out Conveyance Steps G and G'

Figure 26:
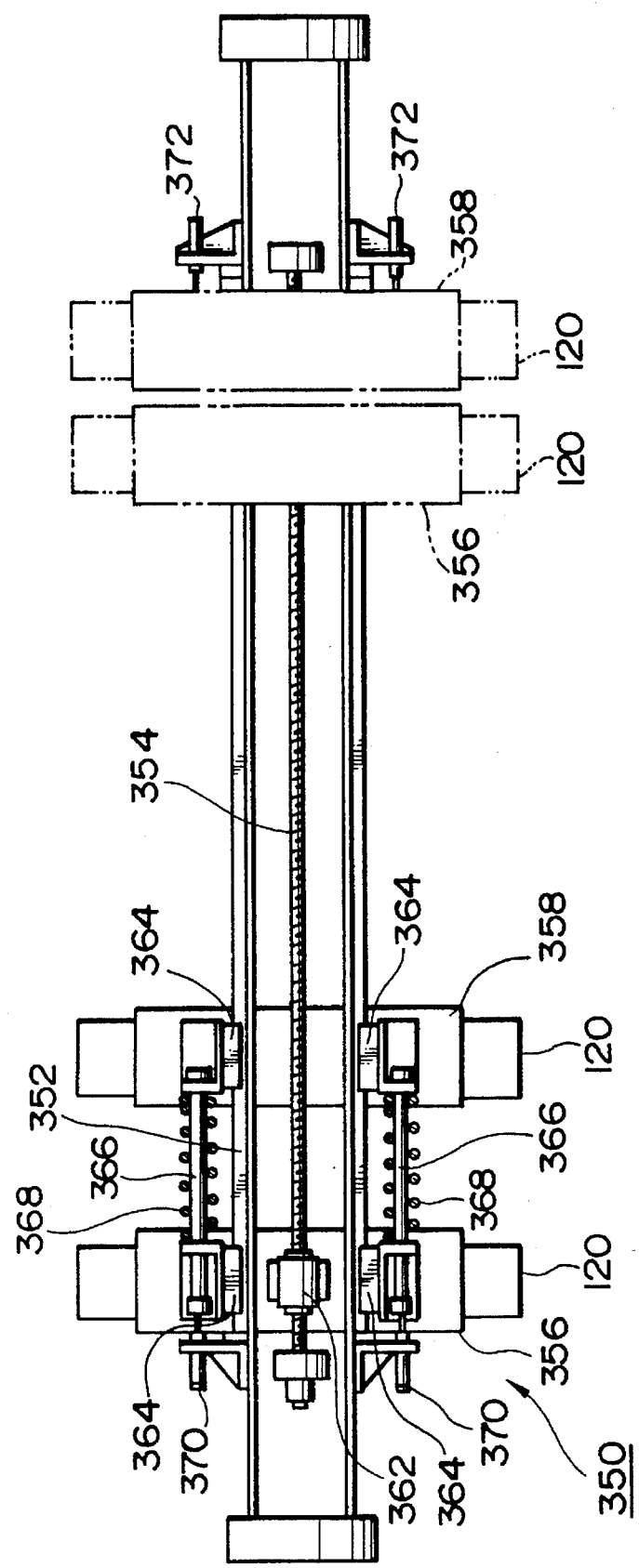
FIG. 26 is a schematic view of the second conveying unit for performing the conveyance steps G and G' in FIG. 13.

These conveyance steps are accomplished by moving the second conveyance unit 350 along a linear guide 352, as described. As shown in FIGS. 11, 18 and 26, the second conveyance unit 350 is adapted to drive two guide rails 356 and 358 through a screw shaft 354 that is rotatably driven by a servomotor 360, as in the first conveyance unit 300. The guide rail 356 includes a ball-nut arrangement 362 which is screwed by the screw shaft 354. Each of the guide rails 356 and 358 is formed with a portion 364 guided by the linear guide 352. The pitch between a pair of neck plates 120 in the second conveyance unit 350 is varied in a manner different from that of the first conveyance unit 300. Two guide shafts 366 are spanned between the two guide rails 356 and 358. A compression coil springs 368 are disposed between the guide rails 356 and 358 and passes through the guide shafts 366. The pitch between the pair of neck plates 120 held by the guide rails 356 and 358 is normally maintained to be widened by the compression coil springs 368. Shock absorbers 370 and 372 are disposed on the second conveyance unit 350 at the opposite ends. When the conveyance step G shown in FIG. 13 is to be carried out, the guide rail 356 is further moved after the other guide rails 358 has reached the shock absorber 372. Thus, the above pitch can be decreased as shown by chain line in FIG. 26.

Device for Carrying Out Conveyance Step H

The conveyance step H is accomplished by a third urging unit 380 and a third cushioning unit 390, as shown in FIG. 17. The third urging unit 380 is adapted to urge an urging piece 384 driven by a rodless cylinder 382 against the rearward ends of the neck plates 120 existing at the dwell position P5. The third cushioning unit 390 is similar to the first cushioning unit 290 and includes a withdrawing plate 294 and a shock absorber 298 which are omitted in FIG. 17. The third cushioning unit 390 functions to cushion the neck plates 120 conveyed into the ejecting station 116 at a position before the neck plates 120 reaches their dwell position, for example, 5 mm in front of the dwell position.

Device for Carrying Out Conveyance Step X

The conveyance step X is realized by alternately moving the framework 250 toward the dwell positions P6 and P7 in the ejecting station 116 after the ejecting step has been terminated.

The present invention is not limited to the illustrated embodiments and may be carried out in various modifications within the scope of the invention. Although the embodiments have been described as to the simultaneous movement of two neck plates 120 toward the respective one of the stations 110a, 110b, 112, 114 and 116, only a single neck plate 120 may be moved toward the corresponding station. The described devices for carrying out the respective conveyance steps shown in FIG. 13 may be replaced by any other drive system. Furthermore, the temperature regulating station 112 may be omitted on carrying out the present invention.

We claim:

1. An injection stretch blow molding method of sequentially circulating a plurality of neck mold moving units for supporting and conveying neck molds adapted to hold neck portions of hollow containers and preforms used to mold the hollow containers at least through preform injection molding, blow molding and ejecting stations, the preform injection molding step, the blow molding step for blow molding the hollow containers from the preforms having potential heat provided by the injection molding step and the product ejecting step being repeatedly carried out, said method comprising the steps of providing injection molding stations of M in number for blow molding stations of N in number (M>N≧1), providing an injection mold clamped with said neck molds for molding the preforms and an injection unit for injecting resin into said injection mold in each of the injection molding stations of M in number, setting an injection start time for one of the injection units staggered from any preceding injection start time for another of the injection units by a time equal to N×T/M, where T is an injection molding cycle time in at least one of the injection molding stations, injection molding the preforms in at least one of the injection molding stations at an injection molding start time staggered from any preceding injection molding start time for another of the injection molding stations by a time equal to N×T/M, moving at least one neck mold moving unit holding the injection molded preforms sequentially to an empty one of said blow molding stations, and blow molding the preforms into the hollow containers, wherein each of the blow molding stations has a blow molding cycle time which is set within N×T/M, and wherein the neck mold moving units are provided in a quantity at least equal to a total quantity of stations.

2. An injection stretch blow molding method as defined in claim 1 wherein said blow molding station of N=1 in number is disposed in a first conveyance line for said neck mold moving units and wherein one of said injection molding stations is disposed in each of conveyance lines of M in number parallel to said first conveyance line, said neck mold moving units equal in number to (M+2), a quantity that is the total number of said stations.

3. An injection stretch blow molding method as defined in claim 2, wherein the number of said neck mold moving units circulated through the stations is (M+3), a quantity that is one more than the total number of said stations and wherein one of said neck mold moving units is placed at a stand-by position on any one of said conveyance lines other than at said stations.

4. An injection stretch blow molding method as defined in claim 2, further comprising providing a temperature regulating station for regulating the temperature of said injection molded preforms to an appropriate stretching temperature and wherein a temperature regulating cycle time in the temperature regulating station is set to be within T/M and the number of said neck mold moving units is equal in number to (M+3), a quantity that is the total number of stations including said temperature regulating station.

5. An injection stretch blow molding method as defined in claim 4, wherein the number of said neck mold moving units circulating through the stations is (M+4), a quantity that is one more than the total number of said stations and wherein one of said neck mold moving units is placed at a stand-by position on any one of said conveyance lines other than at said stations.

6. An injection stretch blow molding method as defined in claim 1, wherein said blow molding station of N=1 in number is disposed in a first conveyance line for said neck mold moving units and said ejecting station and said injection molding stations of M=2 in number are disposed on a second conveyance line extending parallel to said first conveyance line, said two injection molding stations being spaced away from said ejecting station by the same distance and extending parallel to each other and wherein five of said neck mold moving units are circulated through a total of four of said stations and one of said neck mold moving units being placed at a stand-by position on any one of said conveyance lines other than at said stations.

7. An injection stretch blow molding method as defined in claim 6, further comprising providing a temperature regulating station on said first conveyance line for regulating the temperature of said injection molded preforms to an appropriate stretching temperature and wherein a temperature regulating cycle time in said temperature regulating station is set to be within T/2 and wherein the number of said neck mold moving units is six, a quantity that is one more than the total number of said stations including said temperature regulating station, and one of said neck mold moving units being placed at a stand-by position on any one of said conveyance lines other than at said stations.

8. An injection stretch blow molding method as defined in claim 2, wherein said ejecting station is disposed in said first conveyance line.

9. An injection stretch blow molding apparatus comprising a plurality of neck mold moving units for supporting and conveying the neck molds adapted to neck portions of hollow containers and preforms used to form the hollow containers; injection molding stations of M in number, each of said injection molding stations being adapted to receive the neck mold moving units sequentially and to injection mold the preforms at an injection molding start time staggered from any preceding injection molding start time for another of the injection molding stations by a time equal to N×T/M where T is an injection molding cycle time in each of the injection molding stations; blow molding stations of N in number (M>N≧1), each of said blow molding stations being adapted to receive the neck mold moving units each supporting the preforms having their potential heat provided by the injection molding sequentially from the injection molding stations and to blow mold said preforms into the hollow containers; and ejecting stations of N in number for receiving the neck mold moving units each supporting the hollow containers sequentially from the blow molding stations and for ejecting said hollow containers out of said neck mold moving units, the neck mold moving units holding the injection molded preforms being sequentially moved from the injection molding stations to an empty blow molding station, the blow molding stations being adapted to blow mold the preforms into the hollow containers in a blow molding cycle time which is set to be within N×T/M, wherein the neck mold moving units are provided in a quantity at least equal to a total quantity of stations, and wherein one of the blow molding stations is provided in a first conveyance line that is parallel to, and fed by, a plurality of second conveyance lines in which the injection molding stations are provided.

10. An injection stretch blow molding apparatus as defined in claim 9, further comprising an injection mold clamped with said neck molds for molding the preforms and an injection unit for injecting resin into said injection mold in each of the injection molding stations of M in number, wherein an injection start time for one of the injection units is staggered from any preceding injection start time for another of the injection units by a time equal to N×T/M.

11. An injection stretch blow molding apparatus as defined in claim 10, further comprising temperature regulating stations of N in number for sequentially receiving said neck mold moving units from said injection molding stations of M in number and for regulating the temperature of said injection molded preforms to an appropriate stretching temperature and wherein a temperature regulating cycle time in each of said temperature regulating stations is set to be within N×T/M.

12. An injection stretch blow molding apparatus at least comprising a plurality of neck plates for supporting and conveying the neck molds adapted to the neck portions of hollow containers and preforms used to form the hollow containers, the neck plates being conveyed through a number of stations and provided in a number at least equal to the number of stations; a plurality of conveyance lines for conveying the neck plates through the stations; two injection molding stations for alternately receiving said neck plates, each of said injection molding stations being adapted to injection mold said preforms at an injection molding start time different from that of the other injection molding station by substantially one-half of an injection molding cycle time T; a single blow molding station for alternately receiving the neck plates supporting said preforms with their potential heat provided by the injection molding step from said two injection molding stations, said preforms being blow molded into the hollow containers within (T/2), said neck plates traveling between said two injection molding stations and said single blow molding station on said plurality of conveyance lines; and an ejecting station for receiving said neck plates supporting said hollow containers from said blow molding station and for ejecting the hollow containers out of said neck molds, said ejecting station being located in an area adjacent to said two injection molding stations and at a middle position from which said neck plates are moved through said conveyance lines from said ejecting station to said two injection molding stations through an equal distance.

13. An injection stretch blow molding apparatus as defined in claim 12, further comprising an injection mold clamped with said neck molds for molding the preforms and an injection unit for injecting resin into said injection mold in each of said two injection molding stations, wherein an injection start time for one of the injection units is staggered from preceding injection start time for another of the injection units by a time equal to T/2.

14. An injection stretch blow molding apparatus as defined in claim 13 wherein the number of said neck plates circulated through said stations is equal to four, a number that is one more than the total number of said stations and wherein one of said neck plates is placed at a stand-by position on any one of said conveyance lines other than at said stations while the other three neck plates are held at the stations.

15. An injection stretch blow molding apparatus as defined in claim 13, further comprising a temperature regulating station for regulating the temperature of said injection molded preforms to an appropriate stretching temperature and wherein the number of said neck plates circulated through said stations is equal to five, a number that is one more than the total number of said stations and wherein one of said neck plates is placed at a stand-by position on any one of said conveyance lines other than at said stations while the other four neck plates are held at the stations.

16. An injection stretch blow molding apparatus as defined in claim 13 wherein each of said stations includes guide rail means for supporting said neck plates for conveyance-in, conveyance-out and stoppage.

17. An injection stretch blow molding apparatus as defined in claim 16 wherein each of said neck plates includes positioning hole means and wherein each of said stations includes pin means inserted into said positioning hole means to position said neck plate in place.

18. An injection stretch blow molding apparatus as defined in claim 16, further comprising two sets of guide rail means for supporting said neck plates for stoppage, conveyance-in and conveyance-out, each of said guide rail means comprising a guide rail located opposite to any one of said two injection molding stations and another guide rail located opposite to the ejecting station, and drive means for driving said two sets of guide rail means in a direction perpendicular to the direction of conveyance of said neck plates so that one of said guide rail means will be alternately opposed to one of said two injection molding stations.

19. An injection stretch blow molding apparatus at least comprising a plurality of neck plates for supporting and conveying the neck molds adapted to the neck portions of hollow containers and preforms used to form the hollow containers; two injection molding stations for alternately receiving said neck plates, each of said injection molding stations being adapted to injection mold said preforms at an injection molding start time different from that of the other injection molding station by substantially one-half of an injection molding cycle time T; a blow molding station for alternately receiving the neck plates supporting said preforms with their potential heat provided by the injection molding step from said two injection molding stations, said preforms being blow molded into the hollow containers within (T/2); and an ejecting station for receiving said neck plates supporting said hollow containers from said blow molding station and for ejecting the hollow containers out of said neck molds, said ejecting station being located in an area adjacent to said two injection molding stations and at a middle position from which said neck plates are moved from said ejecting station to said two injection molding stations through an equal distance; a first conveyance line including two of said injection molding stations and the ejecting station; a second conveyance line including at least said blow molding station; a third conveyance line for supplying and conveying said neck plates from said first conveyance line to said second conveyance line; a fourth conveyance line for returning said neck plates from said second conveyance line back to said first conveyance line, said first, second, third and fourth conveyance lines defining a conveyance loop; a first conveyance unit reciprocatable along said third conveyance line and for feeding said neck plates from said first conveyance line to said second conveyance line; and a second conveyance unit reciprocatable along said fourth conveyance line and for feeding said neck plates from said second conveyance line to said first conveyance line.

20. An injection stretch blow molding apparatus as defined in claim 19, further comprising a temperature regulating station on said second conveyance line for regulating the temperature of said injection molded preforms to an appropriate stretching temperature.

21. An injection stretch blow molding apparatus as defined in claim 20, further comprising driving and conveying means on said first and second conveyance lines for simultaneously conveying a plurality of said neck plates along the same line in end abutting relationship and wherein said driving and conveying means comprises urging means for urging the rearward ends of said neck plates as viewed from the direction of conveyance and means for withdrawing the forward ends of said neck plates as viewed from the direction of conveyance.

22. An injection stretch blow molding apparatus as defined in claim 19, further comprising two lines of injection cavity molds located in said injection molding station below the position in which said neck plates are stopped and two lines of blow cavity molds located in said blow molding station below the position in which said neck plates are stopped and wherein the sets of said neck plates circulated through said stations are equal to five, a number that is one more than the total number of said stations, each set of said neck plates including two neck plates disposed parallel to each other and conveyed at the same time.

23. An injection stretch blow molding apparatus as defined in claim 22 wherein the pitch between the two lines of said injection cavity molds is smaller than that between the two lines of said blow cavity molds and wherein said first conveyance unit is adapted to increase the pitch between said two neck plates simultaneously conveyed along said third conveyance line, said second conveyance unit being adapted to decrease the pitch between said two neck plates simultaneously conveyed along said fourth conveyance line.

24. An injection stretch blow molding apparatus as defined in claim 20, further comprising two lines of injection cavity molds located in said injection molding station below the position in which said neck plates are stopped and two lines of blow cavity molds located in said blow molding station below the position in which said neck plates are stopped and wherein the sets of said neck plates circulated through said stations are equal to six, a number that is one more than the total number of said stations including said temperature regulating station, each set of said neck plates including two neck plates disposed parallel to each other and conveyed at the same time.

25. An injection stretch blow molding apparatus as defined in claim 24 wherein the pitch between the two lines or said injection cavity molds is smaller than that between the two lines of said blow cavity molds and wherein said first conveyance unit is adapted to increase the pitch between said two neck plates simultaneously conveyed along said third conveyance line, said second conveyance unit being adapted to decrease the pitch between said two neck plates simultaneously conveyed along said fourth conveyance line.

* * * * *